(12) United States Patent
Zheng et al.

(10) Patent No.: US 7,732,076 B2
(45) Date of Patent: Jun. 8, 2010

(54) HEATING SOLID OXIDE FOR FUEL CELL STACK

(75) Inventors: Rong Zheng, Edmonton (CA); Gary Kovacik, Edmonton (CA); Hongsang Rho, Edmonton (CA); Partho Sarkar, Edmonton (CA); Luis Yamarte, Edmonton (CA); Mark L. Richardson, San Franscisco, CA (US)

(73) Assignee: Alberta Research Council Inc., Edmonton, Alberta (CA)

( * ) Notice: Subject to any disclaimer, the term of this patent is extended or adjusted under 35 U.S.C. 154(b) by 655 days.

(21) Appl. No.: 10/597,939

(22) PCT Filed: Feb. 11, 2005

(86) PCT No.: PCT/CA2005/000188

§ 371 (c)(1),
(2), (4) Date: Mar. 13, 2007

(87) PCT Pub. No.: WO2005/078842

PCT Pub. Date: Aug. 25, 2005

(65) Prior Publication Data

US 2007/0243444 A1    Oct. 18, 2007

(30) Foreign Application Priority Data

Feb. 13, 2004    (CA) .................................. 2457609

(51) Int. Cl.
*H01M 8/10* (2006.01)
*H01M 8/04* (2006.01)
(52) U.S. Cl. ............... 429/31; 429/26; 429/17; 429/38; 429/30; 429/34; 429/39; 60/738; 60/752; 60/754; 431/7; 431/37; 431/46

(58) Field of Classification Search ............... 126/99 A; 429/17, 26, 30–31, 34, 39; 60/738, 752, 60/754; 431/7, 37, 46; *H01M 8/04, 8/10*
See application file for complete search history.

(56) References Cited

U.S. PATENT DOCUMENTS 4,395,468 A    7/1983    Isenbergm (Continued)

FOREIGN PATENT DOCUMENTS

CN    1276921    12/2000

(Continued)

OTHER PUBLICATIONS

Abstract of Shen et al (CN85100996).*

(Continued)

*Primary Examiner*—Melvin C Mayes
*Assistant Examiner*—Jun Li
(74) *Attorney, Agent, or Firm*—Davis Wright Tremaine LLP; David H. Deits; Heather M. Colburn

(57) ABSTRACT

This invention relates to a solid oxide fuel cell system comprising at least one longitudinally extending tubular solid oxide fuel cell and a longitudinally extending heater mounted in thermal proximity to the fuel cell to provide heat to the fuel cell during start up and during operation as needed. The heater and fuel cell can be encased within a tubular thermal casing; the inside of the casing defines a first reactant chamber for containing a first reactant, such as oxidant. The fuel cell comprises a ceramic solid state electrolyte layer and inner and outer electrode layers concentrically arranged around and sandwiching the electrolyte layer. The outer electrode layer is fluidly communicable with the first reactant, and the inner electrode layer is fluidly isolated from the first reactant and fluidly communicable with a second reactant, such as fuel.

23 Claims, 17 Drawing Sheets

U.S. PATENT DOCUMENTS

| | | | |
|---|---|---|---|
| 4,490,444 | A | 12/1984 | Isenberg |
| 4,702,971 | A | 10/1987 | Isenberg |
| 5,928,805 | A | 7/1999 | Singh et al. |
| 5,932,181 | A * | 8/1999 | Kim et al. .................. 422/188 |
| 6,124,050 | A | 9/2000 | Stock |
| 6,207,311 | B1 | 3/2001 | Baozhen et al. |
| 6,423,896 | B1 | 7/2002 | Keegan |
| 6,492,050 | B1 | 12/2002 | Sammes |
| 6,562,496 | B2 | 5/2003 | Faville et al. |
| 6,562,502 | B2 | 5/2003 | Haltiner, Jr. |
| 6,966,187 | B2 * | 11/2005 | Modi et al. .................. 60/752 |
| 2003/0235732 | A1 * | 12/2003 | Haltiner, Jr. .................. 429/24 |
| 2004/0105789 | A1 * | 6/2004 | Yamamoto .................. 422/130 |
| 2005/0066663 | A1 * | 3/2005 | Alvin et al. .................. 60/723 |

FOREIGN PATENT DOCUMENTS

| | | |
|---|---|---|
| WO | WO 99/17390 | 4/1999 |
| WO | WO 01/86030 | 11/2001 |
| WO | WO 03/062503 | 7/2003 |

OTHER PUBLICATIONS

Tang, Eric, Brian Borglum and Eric Neary, "From Cells To Systems: An Overview of Global Thermoelectric's SOFC Development Program", 2003.

Zizelman, James, Dr. Jean Botti, Joachim Tachtler and Wolfgang Strobl, "Solid-oxide fuel cell auxiliary power unit: a paradigm shift in electric supply for transportation", 2003.

Bessette, Norman F., Brian P. Borglum, Hermann Schichl and Douglas S. Schmidt, "Siemens SOFC Technology on the Way to Economic Competitiveness", Power Journal: Magazine of the Siemens Power Generation Group, Jan. 2001.

Burnell, Scott R., "Nanotubes could reduce CO2 emissions", United Press International website <www.upi.com>, Sep. 16, 2002.

Harkopf, Dr. Volker H., David H. Archer and Hongxi Yin, "A Fuel Cell Based Energy Supply System for Multi Purpose building", presented at Ideaction 2003, the Fourteenth National Conference of the Facility Management Association of Australia Limited 9FMA Australia), Sydney, Australia, May 7-9, 2003.

"Small Tech Companies Locked in High-Stakes Struggle for Power", Small Times website <www.smalltimes.com>, May 21, 2003.

First Micro Fuel Cell Commercial Product to Appear in 2004, Says ABI, Business Wire, Apr. 8, 2003.

Wrolstad, Jay, "Mobile Tech To Drive Micro Fuel Cell Adoption", Wireless News Factor, Jul. 22, 2002.

"Intel Invest in Neah Power Micro Fuel Cell Technology", Azom.com website <www.azom.com>, Feb. 10, 2003.

* cited by examiner

HEATING SOLID OXIDE FOR FUEL CELL STACK

FIELD OF THE INVENTION

This invention relates generally to solid oxide fuel cell (SOFC) systems, and in particular, to thermal management of an SOFC system.

BACKGROUND OF THE INVENTION

In general, an SOFC comprises a pair of electrodes (anode and cathode) that are separated by a ceramic, solid-phase electrolyte. To achieve adequate ionic conductivity in such a ceramic electrolyte, the SOFC operates at an elevated temperature, typically in the order of between about 700° C. and 1000° C. The material in typical SOFC electrolytes is a fully dense (i.e. non-porous) yttria-stabilized zirconia (YSZ) which is an excellent conductor of negatively charged oxygen (oxide) ions at high temperatures. Typical SOFC anodes are made from a porous nickel/zirconia cermet while typical cathodes are made from magnesium doped lanthanum manganate ($LaMnO_3$), or a strontium doped lanthanum manganate (also known as lanthanum strontium manganate (LSM)). In operation, hydrogen or carbon monoxide (CO) in a fuel stream passing over the anode reacts with oxide ions conducted through the electrolyte to produce water and/or $CO_2$ and electrons. The electrons pass from the anode to outside the fuel cell via an external circuit, through a load on the circuit, and back to the cathode where oxygen from an air stream receives the electrons and is converted into oxide ions which are injected into the electrolyte. The SOFC reactions that occur include:

Anode reaction:

$$H_2 + O^= \rightarrow H_2O + 2e^-$$

$$CO + O^= \rightarrow CO_2 + 2e^-$$

$$CH_4 + 4O^= \rightarrow 2H_2O + CO_2 + 8e^-$$

Cathode reaction:

$$O_2 + 4e^- \rightarrow 2O^=$$

Known SOFC designs include planar and tubular fuel cells. Applicant's own PCT application no. PCT/CA01/00634 discloses a method of producing a tubular solid oxide fuel cell by electrophoretic deposition (EPD). The fuel cell comprises multiple concentric layers, namely an inner electrode layer, a middle electrolyte layer, and an outer electrode layer. The inner and outer electrodes may suitably be the anode and cathode respectively, and in such case, fuel may be supplied to the anode by passing through the tube, and air may be supplied to the cathode by passing over the outer surface of the tube. Multiple such fuel cells can be electrically grouped together into stacks to increase power production density.

Because SOFCs can only operate at elevated temperatures, they must be heated before they can generate electricity. During operation, the fuel cells produce electricity and heat. The generated heat can in some instances be used to maintain the fuel cells at their operating temperature; however, in very small scale applications or in other instances, the fuel cells cannot generate enough heat on their own, or there is not enough thermal insulation around the fuel cells to maintain the fuel cells at their operating temperature. In such instances, heat must be provided from an external source. External heating must also be provided at start up, when the fuel cells are not generating any heat.

It is therefore desirable to provide a fuel cell system that can supply sufficient heat to the fuel cells in the system during start up and during operation. In particular, it is desirable to provide a system that can provide such heat in a relatively quick and efficient manner.

SUMMARY OF THE INVENTION

According to one aspect of the invention, there is provided a solid oxide fuel cell system comprising at least one tubular solid oxide fuel cell and a combustion heater in thermal proximity to the fuel cell(s). Each tubular solid oxide fuel cell comprises a ceramic solid state electrolyte layer and inner and outer electrode layers concentrically arranged around and sandwiching the electrolyte layer; the inner electrode layer is fluidly communicable with only one of an oxidant reactant and a fuel reactant, and the outer electrode layer fluidly communicable with only the other of the oxidant and fuel reactants. The combustion heater is fluidly communicable with the oxidant and fuel reactants such that combustion can occur, and is mounted in sufficient thermal proximity to the fuel cell that the fuel cell can be heated by the combustion to an operating temperature. The heater can fluidly communicate with at least one of a fuel supply and unreacted fuel exhausted from the fuel cell, and/or directly with air and fuel sources.

The system can further comprise a tubular thermal casing. The inside of casing defines a first reactant chamber that contains the fuel cell(s) and the heater, and can contain the reactant that is fluidly communicable with the outer electrode layer. This reactant can be oxidant.

The heater can be tubular and have a dense wall with an inside surface coated with catalytic material that is effective to catalytically burn a mixture of the air and fuel flowing through the heater. Alternatively, the wall can be sufficiently porous to enable the fuel and air mixture to pass uniformly through the combustion heater into the reactant chamber; the pores are coated with catalytic material effective to combust a mixture of the air and fuel flowing through the heater. The heater can be at least partly filled with a porous flame arrestor that has a maximum pore size that is smaller than the quenching diameter of the fuel. This prevents flames from forming inside the heater.

Catalyst material can be used that promotes combustion at room temperature. However, when using catalyst material that promotes combustion at an elevated temperature, means are provided to heat the catalyst to this elevated temperature. In this regard, the heater can further comprise an electric resistive element that generates sufficient heat to heat the catalytic material to its operating temperature. Alternatively, the heater can comprise a flame burner that is fluidly communicable with the air and the fuel and operable to ignite the air and fuel to generate a flame and sufficient heat to heat the catalytic material to its operating temperature. When the catalyst reaches its operating temperature, and catalytic combustion occurs, the flame should go out due to reactant starvation.

The tubular heater can be arranged relative to the casing to define an annular chamber therebetween that is fluidly communicable with an air and fuel mixture. In such case, one or both of the heater and casing are coated with catalytic material effective to combust the air and fuel mixture. The inside of the tubular heater defines an oxidant chamber and the fuel cell(s) are located within this oxidant chamber. These fuel cell(s) can be embedded in a solid state porous foam matrix inside the oxidant chamber.

According to another aspect of the invention, there is provided a solid oxide fuel cell system comprising one or more fuel cells as described above, and a combustion heater comprising a first tube and a dense second tube within the first tube. The inside of the second tube defines a combustion chamber fluidly communicable with the oxidant and fuel reactants such that combustion can occur. An annular space between the first and second tubes defines a reactant heating chamber that is fluidly communicable with one of the reactants and thermally coupled to the combustion chamber such that heat generated from the combustion is transferable to the reactant inside the reactant chamber.

The heater can be located in sufficient thermal proximity to the fuel cell that the fuel cell can be heated to an operating temperature by the heat radiating and conducted from the heater. Alternatively, the fuel cell(s) can be heated by heat carried by the reactant that was heated in the reactant chamber. This reactant can be oxidant, which can also be the reactant in fluid communication with the outer electrode of the fuel cell(s). In this case, the first tube can be sufficiently porous to enable oxidant heated inside the heating chamber to pass through first tube and communicate directly with the outer electrode layer.

The heater can further comprise a fuel and oxidant pre-mixing chamber that is fluidly coupled to an inlet end of the combustion chamber, and fluidly communicable with the fuel and oxidant such that the fuel and oxidant are mixed therein. The combustion chamber can be at least partly filled with a porous flame arrestor that has a maximum pore size that is smaller than the quenching diameter of the fuel. Instead of using a pre-mixer, the heater can further comprise a flame burner fluidly coupled to the inlet end of the combustion chamber, and fluidly communicable with the fuel and oxidant such that the fuel and oxidant are ignited to form a flame.

Furthermore, the heater can comprise a porous third tube inside the second tube. An annular space in between the second and third tubes defines a combustion air chamber, and the inside of the third tube defines a combustion fuel chamber. The combustion air chamber is fluidly communicable with the oxidant and the combustion fuel chamber is fluidly communicable with fuel that is at a higher pressure than the oxidant, thereby causing the fuel to permeate radially through the third tube and into the combustion air chamber for combusting with the oxidant therein. Alternatively, the combustion fuel chamber is fluidly communicable with fuel at a lower pressure than the oxidant in the combustion air chamber, thereby causing oxidant to permeate radially through the third tube and into combustion fuel chamber for combusting with the fuel therein.

Alternatively, the heater can comprise a porous third tube located inside the second tube such that an annular space in between the second and third tubes defines a first combustion chamber, and an inside of the third tube defines a second combustion chamber. The first combustion chamber has an exhaust outlet and the combustion fuel chamber fluidly communicable with the fuel and oxidant; the fuel and oxidant form a mixture therein that permeates radially through the third tube and into the first combustion chamber for combusting. This heater can further comprise an flame igniter in the first combustion chamber that is used to ignite the fuel and oxidant mixture therein for combustion by flame burning. With or without the igniter, the heater can have pores on the third tube that are coated with a catalytic material sufficient to catalytically combust the oxidant and fuel mixture passing therethrough.

The combustion heater can alternatively comprise a porous outer tube and a porous inner tube within the outer tube. The inside of the inner tube defines an inner combustion chamber fluidly communicable with the oxidant and fuel reactants which form a mixture therein. An annular space between the first and second tubes defines an outer combustion chamber in which fuel and oxidant mixture radially permeating through the inner tube is combusted. This heater can have a flame igniter located in the outer combustion chamber, and which is used to ignite the fuel and oxidant mixture therein for combustion by flame burning. Whether there is an igniter, the pores of the inner tube can be coated with a catalytic material sufficient to catalytically combust the oxidant and fuel mixture passing therethrough.

According to another aspect of the invention, there is provided a fuel cell system comprising one or more fuel cells as described above, and a reformer for reforming a hydrocarbon fuel into a reformate for use as a fuel by the fuel cell(s). This reformer is fluidly coupled to a fuel inlet end of the fuel cell(s) and comprises reformer catalytic material that reforms hydrocarbon fuel into reformate fuel. The reformer can be a porous reformer catalyst material that at least partially fills the inside of each fuel cell at the fuel inlet end. Or, the reformer can be a tube at least partially filled a porous reformer catalyst material; this reformer tube has a discharge end that is fluidly coupled to the fuel inlet end of each fuel cell. Or, the system can have a fuel inlet manifold assembly that is fluidly coupled to the fuel inlet end of each fuel cell, communicable with a hydrocarbon fuel source, and at least partially filled with a porous reformer catalyst material.

DETAILED DESCRIPTION OF EMBODIMENTS OF THE INVENTION

References in this description to directional terms such as "top", "bottom", "side" are used merely for convenient reference when describing the embodiments of the invention, and are not intended to limit the orientation of the embodiments in use or in connection to another component in a system.

When describing the present invention, the following terms have the following meanings, unless indicated otherwise. All terms not defined herein have their common art-recognized meanings.

The term "ceramic" refers to inorganic non-metallic solid materials with a prevalent covalent or ionic bond including, but not limited to metallic oxides (such as oxides of aluminum, silicon, magnesium, zirconium, titanium, chromium, lanthanum, hafnium, yttrium and mixtures thereof) and nonoxide compounds including but not limited to carbides (such as of titanium tungsten, boron, silicon), suicides (such as molybdenum disicilicide), nitrides (such as of boron, aluminum, titanium, silicon) and borides (such as of tungsten, titanium, uranium) and mixtures thereof; spinels, titanates (such as barium titanate, lead titanate, lead zirconium titanates, strontium titanate, iron titanate), ceramic super conductors, zeolites, and ceramic solid ionic conductors (such as yttria stabilized zirconia, beta-alumina and cerates).

The term "cermet" refers to a composite material comprising a ceramic in combination with a metal, typically but not necessarily a sintered metal, and typically exhibiting a high resistance to temperature, corrosion, and abrasion.

Figure 1A:
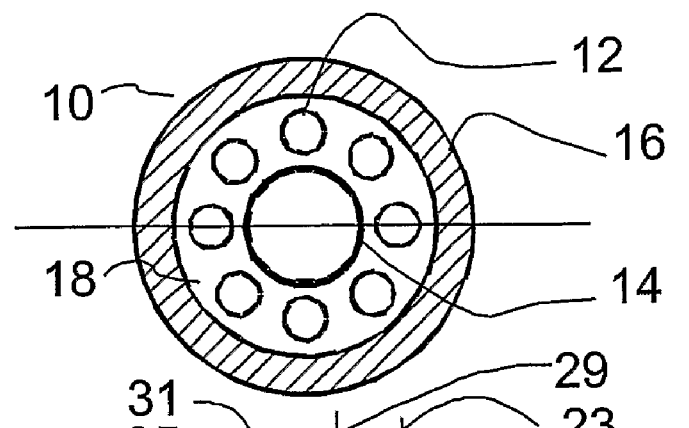
FIGS. 1(a) and (b) are schematic top and side sectioned views of a fuel cell system comprising a plurality of single ended tubular fuel cells surrounding a first embodiment of a combustion heater.
Figure 1B:
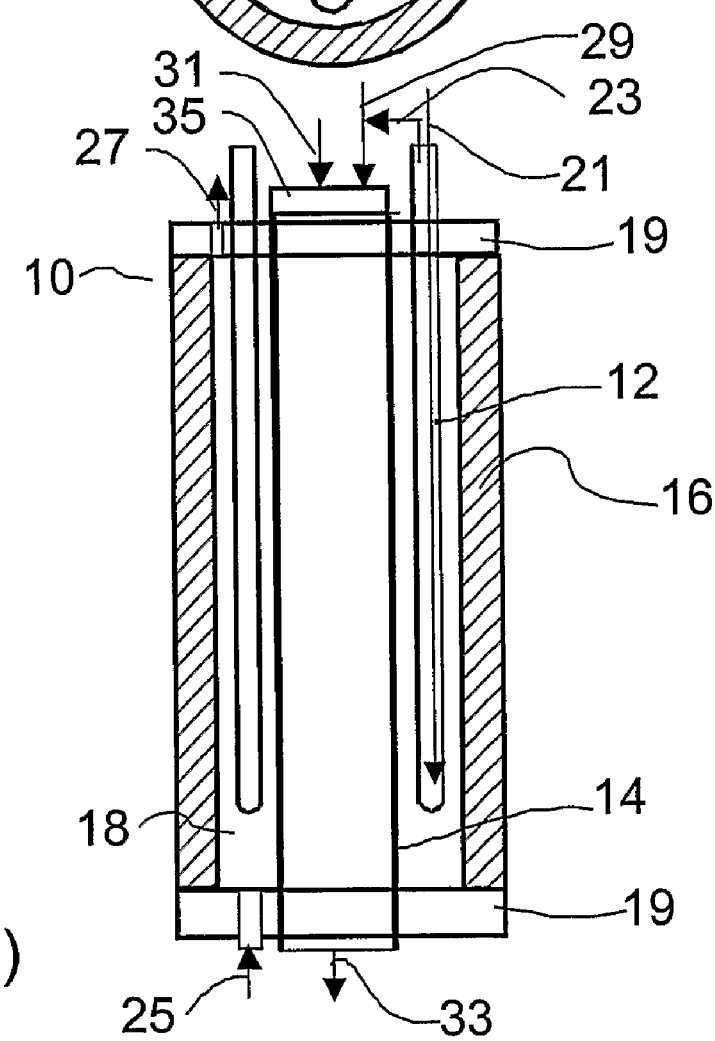

Referring to FIG. 1 and according to a first embodiment of the invention, a fuel cell system 10 includes a plurality of longitudinally-extending tubular solid oxide fuel cells 12 spaced equally from and around the outside of a longitudinally-extending central combustion heater 14. The combustion heater in this first embodiment is an elongated tube coated on its inside surface with catalytic material and having an inlet end that fluidly communicates with fuel and air ("combustion fuel" and "combustion air" respectively), and an outlet end that discharges exhaust gases and combustion products. The fuel cells 12 and combustion heater 14 are surrounded by a longitudinally-extending outer casing 16; the combustion heater 14 and the casing 16 define an annular chamber 18 in which the fuel cells 12 reside. The ends of the casing 16 are capped by respective top and bottom end caps 19, which are provided with openings that serve to hold the fuel cells 12 and combustion heater 14 in place and pass air and fuel to and from the system 10 for electrochemically producing electricity ("reactant air" and "reactant fuel"), and for combusting to produce heat (combustion air and combustion fuel).

The fuel cells 12 are of a micro-tubular type that may be manufactured, for example, by the methods taught in Applicant's published Patent Cooperation Treaty applications PCT/CA01/00634 or PCT/CA03/00059. PCT application PCT/CA01/00634 teaches the production of a tubular SOFC by electrophoretic deposition (EPD) and PCT/CA03/00059 teaches the production of a tubular SOFC by metal electrodeposition (MED) or composite electrodeposition (CED). Micro tubular fuel cells produced by these techniques have a hollow tubular ceramic-containing structure and comprise concentric contacting membrane layers that serve as the anode, electrolyte, and cathode of the fuel cell. In the context of this application, "micro-tubular" SOFC means an SOFC having a diameter of 5 mm or less. These micro-tubular fuel cells can have diameters as small as about 10 μm, and various cross-sectional geometries, such as circular, square, rectangular, triangular, and polygonal. Although this description primarily describes a fuel cell system using micro-tubular fuel cells with a circular cross-section produced by these techniques, it is within the scope of the invention to use larger diameter tubular fuel cell tubes with non-circular cross-sectional geometries, that are made by other techniques as known in the art.

The inner electrode can be the anode and can have one or more sub-layers. In this embodiment, the inner electrode has three sub-layers (not shown), in which an innermost sub-layer ("$1^{st}$ anode sub-layer") is made by MED or CED and can multiple openings therethrough to allow fuel to reach a middle anode layer ($2^{nd}$ anode sub-layer). The main function of the $1^{st}$ anode sub-layer is current collection and suitable materials for this sub-layer are a metal such as Ni or Cu (deposited by MED) or a cermet such as Ni (or Cu) and yttria stabilized zirconia or doped ceria (deposited by CED). The $2^{nd}$ anode sub-layer is deposited onto the $1^{st}$ anode sub-layer by EPD and has a composition comprised of a mixture of nickel oxide and yttria stabilized zirconia or doped ceria. This sub-layer also serves to collect current as well as to provide mechanical support for the fuel cell; the sub-layer has a thickness selected to provide suitable mechanical support and thus tends to be the thickest of the three anode sub-layers. A $3^{rd}$ anode sub-layer is deposited by EPD onto the $2^{nd}$ anode sub-layer and has a composition comprised of a mixture of nickel oxide and yttria stabilized zirconia or doped ceria. One of the powders must have smaller average particle size than the $2^{nd}$ anode sub-layer. This $3^{rd}$ anode sub-layer will have a higher triple phase boundary and the majority of the electrochemical reaction will happen in this sub-layer.

Figure 2A:
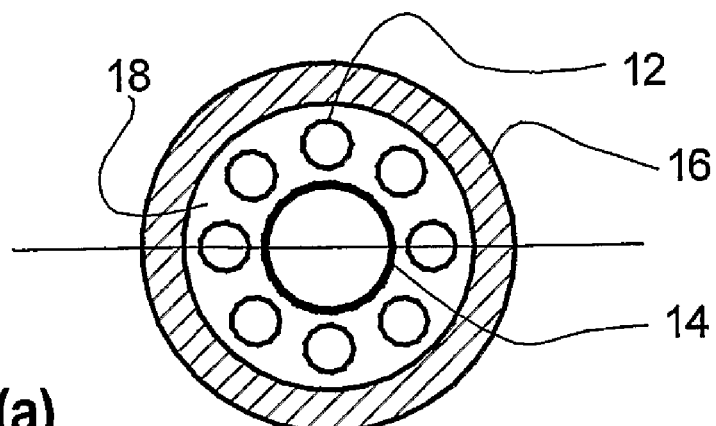
FIGS. 2(a) and (b) are schematic top and side sectioned views of a fuel cell system according to a second embodiment of the invention and comprising a plurality of tubular fuel cells open at both ends surrounding the combustion heater of FIG. 1.
Figure 2B:
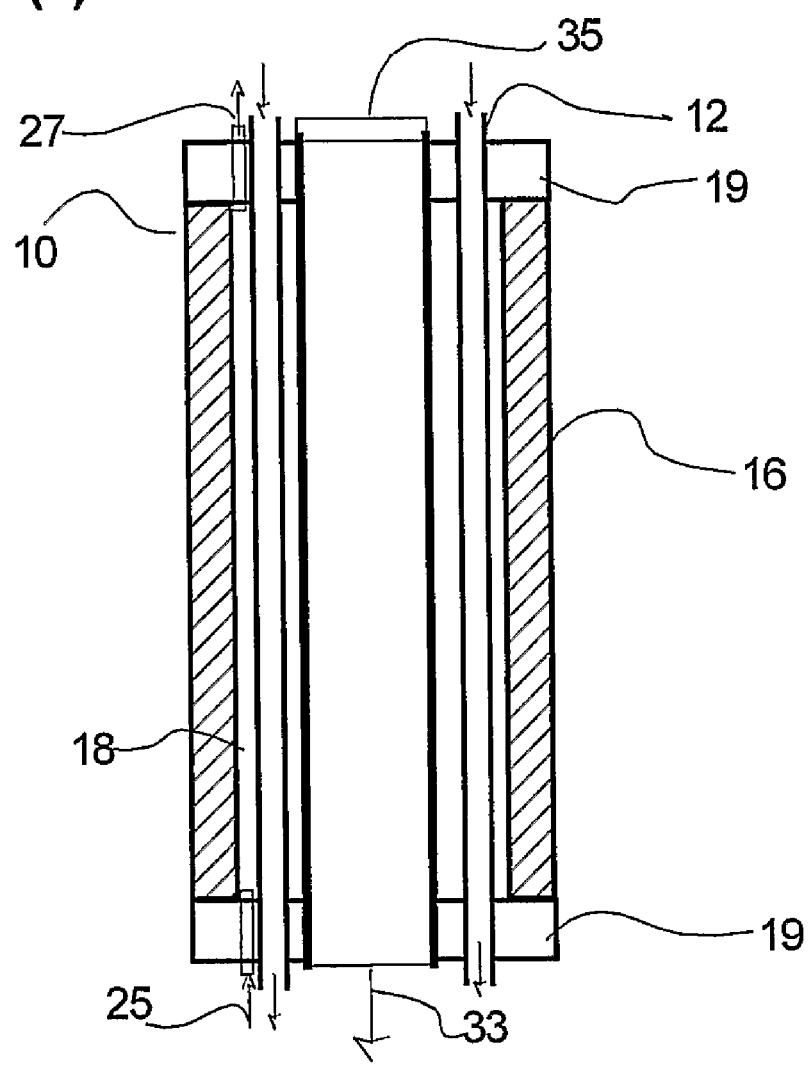

The fuel cells 12 are closed at one end and have an open end that extends above the top edge of the casing 16 and through the top end cap 19. Optionally, the fuel cells 12 can have both ends open as shown in FIGS. 2(a) and (b). As the inner layer in each fuel cell 12 is the anode layer, the outer layer is the cathode layer. Accordingly, the open end of each fuel cell 12 is coupled to a fuel source (not shown) such that gaseous reactant fuel is transmitted to the inside of each fuel cell 12 for electrochemical reaction. The fuel can be pure hydrogen gas stored in a metal hydride tank, or produced on demand from water by electrolysis, or other methods as is known in the art. Or, the fuel can be a reformate produced by a reformer from a hydrocarbon fuel such as natural gas, methanol, butane etc. The reformer 102 can be integrated into each fuel cell 12 as shown in FIG. 3 and FIG. 4, or be a separate unit attached to a plurality of fuel cells as shown in FIGS. 5 and 6.

Figure 3:
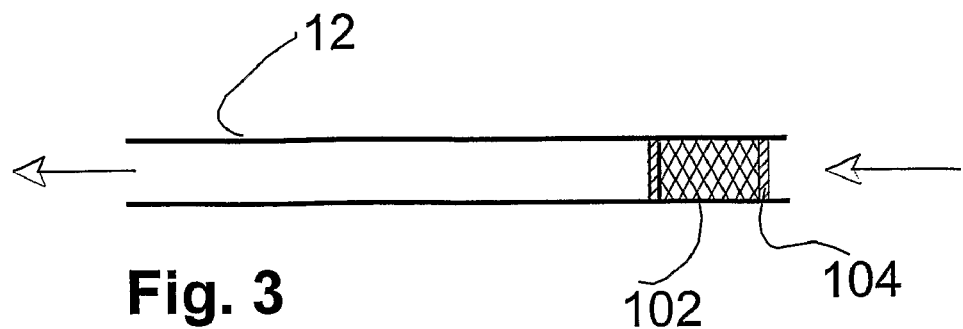
FIG. 3 is a schematic sectioned side view of a tubular fuel cell having a reformer reactor installed in a fuel inlet side of the fuel cell.

Referring to FIG. 3, a tubular fuel cell 12 is open at both ends and has a reformer reactor 102 mounted inside the fuel cell 12 at the fuel inlet side. The reactor 102 comprises porous reformer catalyst material packed into the fuel inlet side of the fuel cell 12 such that it allows reformation as well as gas flow through. The catalyst material can be particulate or granular catalyst support structure that is coated with appropriate reformer catalyst as known in the art; on each side of the catalyst material is a porous stopper 104 that holds the catalyst material in place within the fuel cell 12. Alternatively, the reactor 102 can comprise a felt or fibrous high temperature textile or bulk porous material catalyst support structure that is coated with appropriate reformer catalyst; in this case, the stopper 104 is not required. In particular, the reformer 102 can be a ceramic, metal or cermet foam or a porous mass that is coated with catalyst material on the fuel inlet side, or be a porous or foamy anode current collector that is coated with catalyst material.

Figure 4:
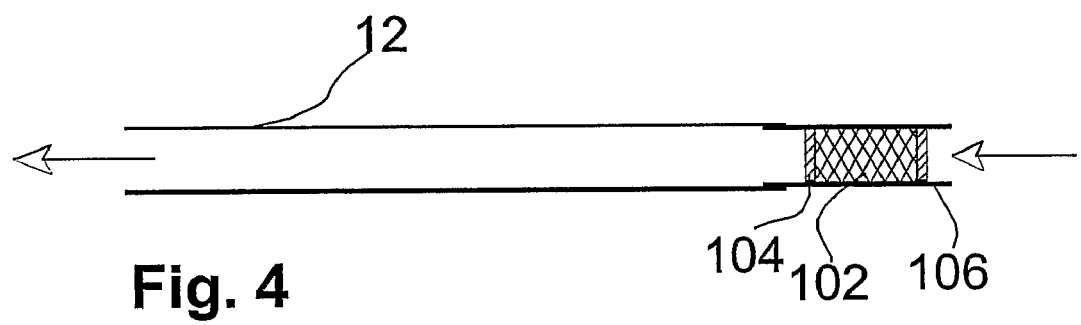
FIG. 4 is a schematic sectioned side view of a reformer reactor installed in an extension tube mounted to a fuel inlet side of a fuel cell.

Referring to FIG. 4 and according to another embodiment of the invention, the fuel cell 12 can have an extension tube 106 mounted to the fuel inlet side of the fuel cell 12. The reformer reactor 102 can be totally situated in the extension tube 106 as shown in FIG. 4, or partially situated in the extension tube 106 and partially situated in the fuel cell (not shown).

Figure 5A:
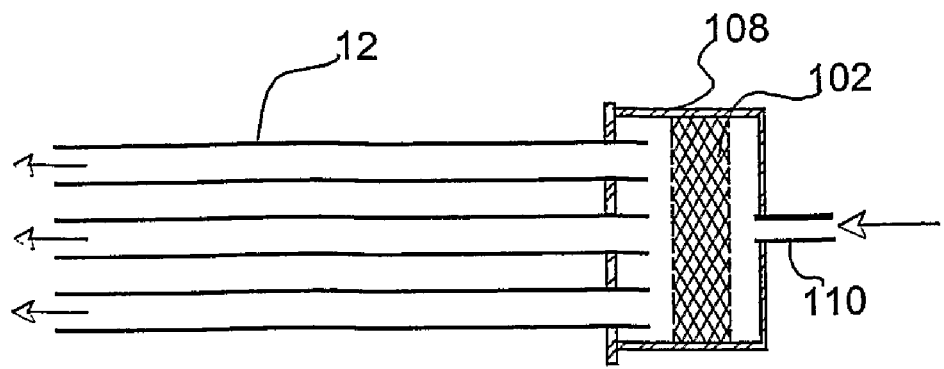
FIGS. 5(a) to (e) are schematic sectioned side views showing different embodiments of a reformer reactor installed inside a fuel distribution manifold that is fluidly coupled to a plurality of fuel cells.
Figure 5B:
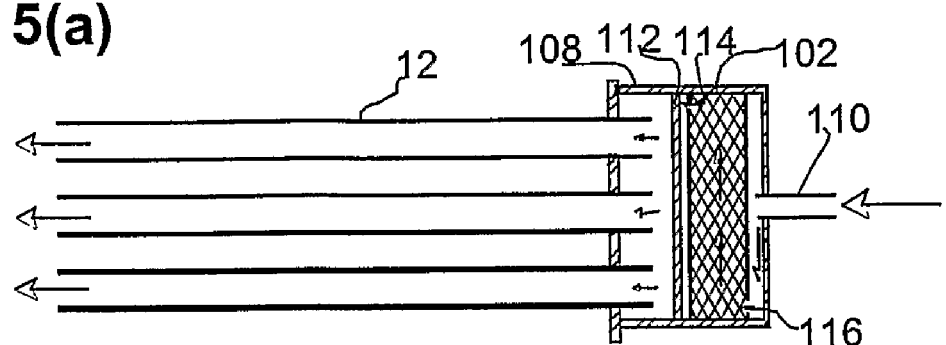
Figure 5C:
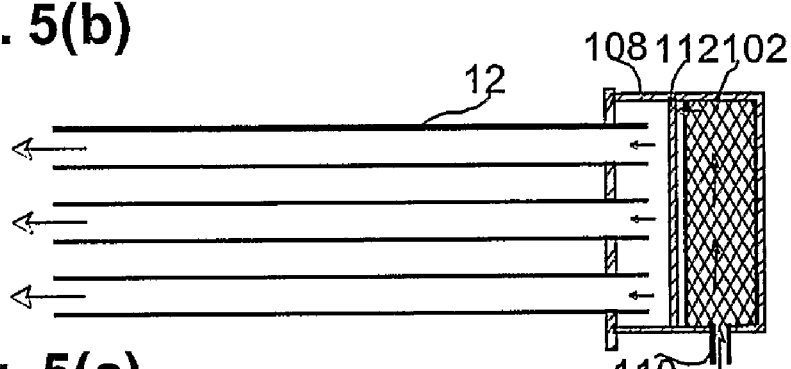
Figure 5D:
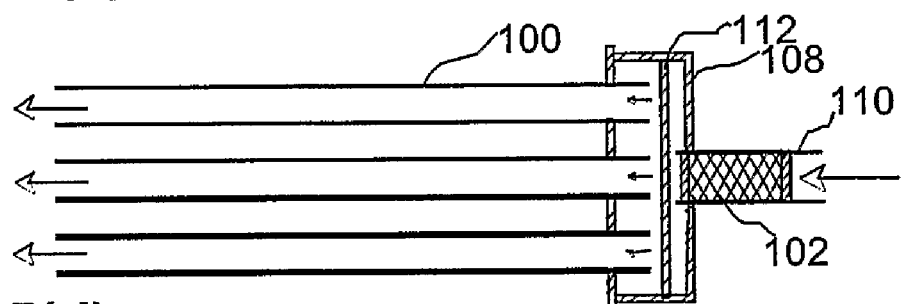

Referring to FIGS. 5(a)-(e) and according to another embodiment of the invention, a fuel inlet manifold 108 is provided that is fluidly coupled to a plurality of the fuel cells 12 and has a fuel inlet conduit 110 that receives fuel for distribution to each fuel cell 12. Referring to FIG. 5(a), the reformer reactor 102 is situated inside the fuel inlet manifold 108 such that fuel passes through the reactor 102 and to the fuel cells 12. Optionally and referring to FIG. 5(b), the fuel reformation pathway through the reactor 102 can be lengthened by installing a fuel inlet guide 116 having a fuel inlet located upstream of the reactor 102, a fuel outlet guide 114 having a fuel outlet located downstream of the reactor 102 and a fuel distributor plate 112 located in a spaced position downstream of the fuel outlet guide 114. Optionally, and referring to FIG. 5(c), the fuel inlet guide 116 can be omitted and the fuel reformation pathway length can be maintained by moving the fuel inlet conduit 110 to a lateral position on the manifold 102. Optionally and referring to FIG. 5(d), the reactor 102 can be installed in the inlet conduit 110, which enables a longer fuel reformation pathway than in the embodiments shown in FIGS. 5(a)-(c) using the same amount of reactor material and without using guides 114, 116, since the cross-section of the reactor 102 is reduced. Optionally, additional reformer material can be packed in the fuel inlet end of each fuel cell 12.

Figure 5E:
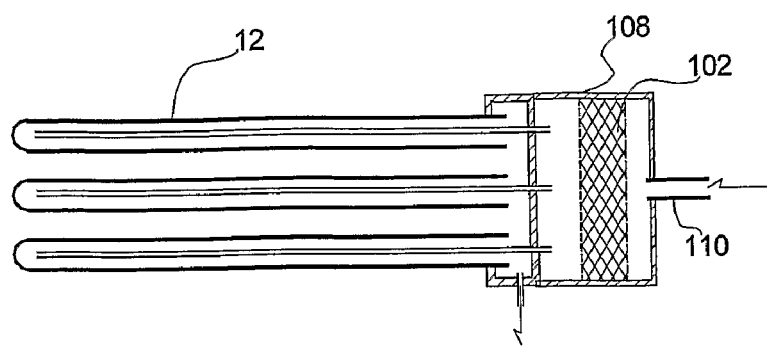
Figure 6:
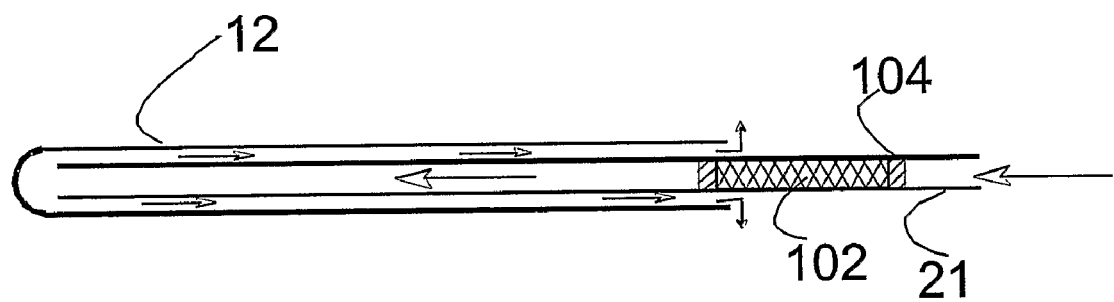
FIG. 6 is a schematic sectioned side view of a single ended fuel cell and a reformer reactor installed inside a fuel distribution tube fluidly coupled to the fuel cell.

Though FIGS. 5(a)-(d) show fuel cells 12 each with both ends open, the fuel cells 12 can be readily adapted to be single-ended, as shown in FIG. 5(e). In case of a single ended fuel cell (e.g. as shown in FIG. 1), the reformer reactor 102 can be located in the open end of the fuel distribution tube 21 as shown in the FIG. 6, or as shown in FIG. 5(e), the reformer reactor can be located in a fuel manifold. Optionally, in all the above embodiments, the reformer reactor may have more than one reaction zone (not shown) in which each zone has different catalyst material. Also, each zone may have a different operating temperature and the choice of catalyst material for a particular zone can depend on the operating temperature of the zone.

Referring again to FIG. 1, the fuel source supplies fuel to the fuel distribution tube 21, which is inserted into each fuel cell 12 such that the reactant fuel is discharged from the distribution tube 21 near the bottom of the fuel cell 12; the reactant fuel then flows upwards and is electrochemically reacted. Excess reactant fuel and reaction products are discharged from the open top end of the fuel cell 12 out of the system 10, or is fed into the combustion heater 14 and burned to produce heat for the system 10 (shown as arrow 23), as will be described below.

Reactant air is flowed through an air inlet 25 in the bottom end cap 19, into the chamber 18, and out of the chamber 18 through an air outlet 27 at the top end cap 19. The reactant air flows over the cathode surface of each fuel cell 12 and thus provides the oxygen required for electrochemical reaction. Optionally and as will be described in more detail below, the air outlet can be coupled to the inlet end of the combustion heater 14 (not shown) to direct exhaust air from chamber 18 into the heater 14 for combustion.

Alternatively, the air inlet can be on the top end cap 19 and the air outlet on the bottom end cap 19, or the air inlet and outlet can be on the same end cap 19. When the air inlet and air outlet are on the same cap 19, a distribution tube (not shown) similar to the fuel distribution tube 21 is connected to the air inlet to flow air from the air inlet to the other end of the fuel cell so that air can flow back over each fuel cell's reaction zone and back to the outlet. Incoming and exhaust air can pass through a heat recuperator (not shown in the figure).

In order for an electrochemical reaction to occur, the fuel cells 12 and their reactants must be at an adequate operating temperature, typically between 500-1000° C. and particularly around 800° C. Heat is supplied to the fuel cells 12 by combusting fuel in air inside the combustion heater 14. The combustion heater 14 is made of a thermally conductive material that can withstand typical SOFC operating temperatures, i.e. temperatures up to 1000° C. Such material includes ceramics such as SiC, $Al_2O_3$, $SiO_2$, MgO, and $ZrO_2$, high temperature metals or metal alloys such as Inconel, stainless steel, ferretic steel, cermets (e.g. a ceramic such as SiC, $Al_2O_3$ with a metal such as Inconel, stainless steel, ferretic steel, stainless steel), ceramic-coated metals, or metal-coated ceramics. The walls of the combustion heater 14 is sufficiently porous and/or perforated to allow the flow of air and fuel therethrough and to provide sites for catalyst deposition; alternatively, the walls can be dense (non-porous).

The casing 16 is made from a thermally insulating material such as a ceramic insulator, aerogel, vacuum flask (made from quartz glass, Pyrex glass, stainless steel; when made with glass, the vacuum flask can be covered with a thermally reflective coating such as silver, gold, or any other suitable insulating material as is known in the art) or heat recuperator. The casing 16 can be cylindrical, or have a different cross-sectional geometry. The selected thickness of the casing 16 will depend on the available space in the application in which the system 10 is used; when used in small-scale portable electronic devices, the casing 16 is kept relatively thin for packaging reasons which reduces the effectiveness of the casing 16 to insulate the system 10 from thermal losses. In certain very small applications, the casing 16 is too thin to enable the system 10 from generating enough heat from the electrochemical reaction alone to continuously maintain an adequate operating temperature.

On those occasions where the operating temperature cannot be sustained by heat generated solely by the fuel cell, or during start up, the combustion heater 14 supplies heat from combustion to the system 10 in order to keep the system 10 at a suitable operating temperature. A combustion fuel supply conduit 29 and an combustion air supply conduit 31 feed fuel and air respectively into the combustion heater 14 at its inlet end. The air and fuel can be exhaust reactant air and fuel from the fuel cell. The fuel and air mix within the heater 14, and are flamelessly catalytically burned along the length of the heater 14 to produce heat. Unused heating fuel, air and combustion products are exhausted from the combustion heater 14 via its outlet end 33. The pores of the combustion heater 14 are coated with a suitable catalytic material such as platinum, palladium or other materials as is known in the art. The product heat warms the reactant air and the fuel cells 12 inside the chamber 18 by radiation and conduction. When supplying heating fuel at a sufficiently high pressure, some of the heating fuel will permeate through the combustion heater 14 and combust with reactant air in the chamber 18. The heat released as a result of the combustion will contribute to heating the reactant air in the chamber 18 and the fuel cells 12. The reactant air flow rate through the chamber 18 is managed to ensure that combustion products are removed at a sufficient rate that they do not accumulate inside the chamber 18.

Although the fuel and air are flamelessly catalytically burned, flames may form on the outside surface of the combustion heater 14, e.g. when the fuel temperature exceeds the fuel's auto-ignition temperature. If the combustion heater produces a flame either instead of or in addition to catalytic combustion, then means can be provided to reduce the chance of the flame either damaging the nearby fuel cells 12 or other system components or producing a highly non-uniform heat distribution regardless of device orientation. Suitable such means include a cylindrical shroud (not shown) that surrounds the combustion heater 12, thereby encasing the flame region. The shroud can be dense (non-porous) when the combustion heater receives pre-mixed fuel and air, or be porous (e.g. perforated) when the combustion heater 14 receives unmixed or incompletely mixed fuel and air. The shroud will be heated by the flame and/or catalytic combustion and will, in turn, provide heat to the fuel cells 12 via conduction and radiation.

The pores and perforations of the optional shroud and the walls of the combustor heater 14 have a diameter of less than the quenching diameter for the fuel in use, so that the flame will not pass through the shroud and combustor heater walls 14. For example, the quenching diameter for hydrogen-air is about 0.7 mm and for methanol-air is 2.4 mm. The inner combustor heater wall and outer shroud wall both will act as "flame holders" and can be constructed according to methods known in the art.

The flow rate of combustion fuel and air gases through the combustion heater 14 is regulated such that the velocity of the gases within the flame zone does not exceed the flame velocity specific to the fuel-air mixture in use, otherwise the flame will not stabilize in place and blow off. For example, the flame velocity for hydrogen-air is about 3 meters/sec and for methanol/air is 0.5 meters/sec.

While one row of fuel cells 12 encircles the combustion heater 14 in the embodiment shown in FIG. 1, additional rows of fuel cells 12 can be provided in the system 10. The number of fuel cells 12 used in the system 10 will depend on part on size restrictions. In particular, in micro electronics or other portable applications, the fuel cell system 10 will have to be kept as small and as light as possible, in which case the system 10 can be configured with fewer fuel cells 12 than in cases where system size is not a limiting factor.

Also optionally, the combustion heater 14 can be filled with a solid-state, thermally conductive porous foam matrix (not shown) or other suitable porous material that is able to withstand SOFC operating conditions. The pores have a maximum size that is less than the quenching diameter. This prevents any flame from forming and passing through the length of the tube.

In operation, the fuel cell system 10 must first be heated to a temperature that will enable the fuel cells 12 to operate; it has been found that when the fuel cells 12 are based on yttria-stabilized zirconia (YSZ) materials, the fuel cells 12 can start to electrochemically produce electricity at about 600° C. and when based on doped ceria-based materials, the fuel cells can start to produce electricity at around 450° C. In order to heat the fuel cells 12 to this temperature, the combustion heater 14 is used to produce heat on start-up by combusting heating fuel and air.

The choice of catalytic material dictates the temperature at which combustion occurs. Certain catalytic material enables certain fuels like hydrogen and methanol to combust at room temperature. When the combustion heater 14 is coated with such catalytic material, combustion air and fuel are simply fed into the combustion heater 14 and combustion occurs, producing heat. However, certain other catalytic material do not promote combustion until they reach an elevated temperature. In such case, a burner 35 is provided to ignite the combustion fuel and air to produce sufficient heat to heat the catalytic material to its operating temperature, which is typically in between about 100-300° C. The burner 35 is mounted at the upstream (top) end of the combustion heater 14 and in the flow path of the heating fuel and air. Optionally, the burner 35 can be mounted in the bottom end of the tube 14 in the flow path of the heating fuel and air. A piezoelectric spark or other suitable sparking means inside the burner is used to ignite the fuel stream 29 passing through the burner 35.

Alternatively, the burner 35 can be replaced by an electric heater (not shown) as is known in art. In particular, a small electric heater is preferably surface mounted to the system 10, and serves to heat a small area to a sufficiently high temperature so that catalytic burning can start at that location and then the catalytic burning can heat up a surrounding area where catalytic and then the catalytic burning can heat up a surrounding area where catalytic burning can expand. In this way catalytic burning will spread throughout the tube combustion heater 14 wherever catalyst is present.

The system 10 is started by first supplying the pressurized combustion fuel stream 29 and air stream 31 through the burner 35 and igniting same to produce heat. The combustion fuel stream 31 can come from the same source as the reactant fuel and/or from unreacted fuel discharged by the fuel cells 12 via outlet 23. Similarly, air for combustion can come from fresh air or from the used air discharged from the fuel cells 12 via outlet 27. The reactant fuel supply to the fuel cells 12 is turned off or optionally can be flowed at a trickle to the fuel cells 12 to purge air or other gases resident in the fuel cells 12. Once the catalyst in the combustion heater 14 is warmed to its operating temperature, the heating fuel stream 29 is stopped to quench the flame, then restarted to supply fuel to the combustion heater 14 for catalytic burning.

The heat produced by catalytic burning is used to heat the fuel cells 12 to about 450-700° C. Once fuel cells 12 reach this temperature range, they start to produce electricity. The fuel cells 12 then rapidly warm to their ideal operating temperature of about 500-800° C. (exact ideal operating temperature depends on the type of electrolyte) and at that time, the heating fuel stream 29 is turned off or reduced. A temperature sensor (not shown) connected to a control system (not shown) is used to monitor the temperature of the system 10; when the temperature falls below a selected lower temperature threshold (i.e. around a temperature where the electrochemical reaction will stop or performance be substantially degraded), the control system regulates the heating fuel stream 29 into the combustion heater 14 to produce heat as required to keep the system 10 at its ideal operating temperature using for example, a proportional-integral-derivative (PID) or other control algorithm known in the art. Unreacted fuel 23 from the fuel cells 12 can also be supplied to the combustion heater 14, as the electrochemical reaction typically only consumes about 70-80% of the fuel supplied to the fuel cells 12. Control valves (not shown) are provided to control the flow of heating fuel streams 23 and 29 into the combustion heater 14.

Alternatively, the combustion heater 14 can be supplied fuel entirely from unreacted exhaust fuel 23 (i.e. no separate heating fuel stream 29 is provided). At start up, the fuel cells 12 are not yet producing electrical power and thus the fuel exhaust stream 23 exiting each fuel cell 12 contains approximately 100% fuel (the balance being water vapor etc.). This exhaust fuel stream 23 is fed into the combustion heater 14 and oxidized to produce enough heat to heat up the fuel cell stack. The fuel flow to the fuel cells 12 and to the combustion heater 14 can be controlled so that heat and electricity are both produced in sufficient quantities. Consider for example a fuel cell stack that typically requires 100 ml/min of fuel to operate to produce electricity. At start up, an initial fuel flow rate is selected that will be sufficient to operate the combustion heater 14 to produce sufficient heat for stack operation; this flow rate may be lower or higher than 100 ml/min. As heat is generated by the combustion heater 14 and the stack becomes warm enough to produce power, some of the fuel will be utilized by the stack to produce electricity (as well as some heat), and as a result, the amount of fuel in the exhaust fuel stream 23 flowing to the combustion heater 14 will decrease. As the stack reaches its operating temperature, less heat is required from the combustion heater 14 than at start-up, which conveniently corresponds to a reduced heat production by the combustion heater 14 resulting from receiving less fuel from the exhaust fuel flow. Fine tuning of stack temperature can be performed by controlling the air flow rate and fuel flow rate to the fuel cells 12. Combustor and fuel cell exhaust air can pass through a heat recuperator (not shown) that recovers some of the produced heat to be used to heat the stack; fuel cell exhaust air will go directly to the recuperator when not used for combustion in the heater 14.

Figure 7:
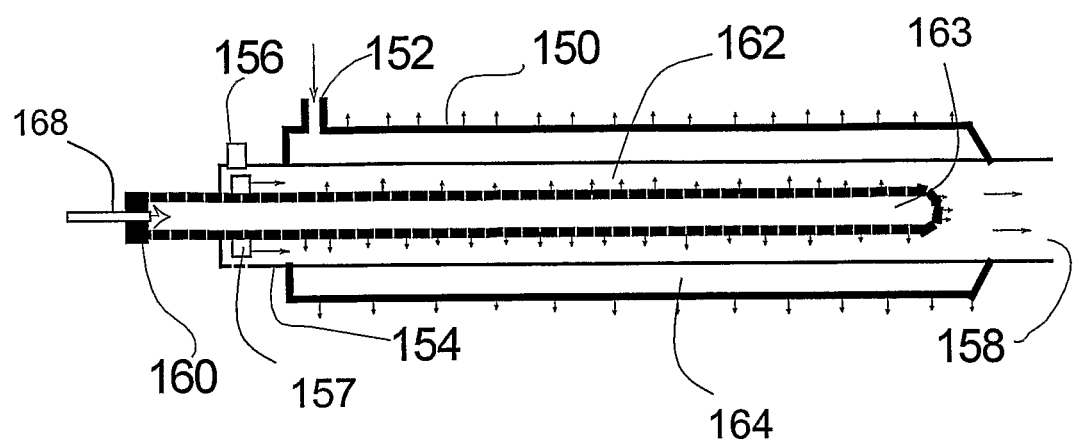
FIG. 7 is a schematic sectioned side view of a second embodiment of the combustion heater, and having a plurality of concentrically arranged tubes that define a plurality of fluid flow chambers, including a combustion air chamber in which flame burning occurs.
Figure 8:
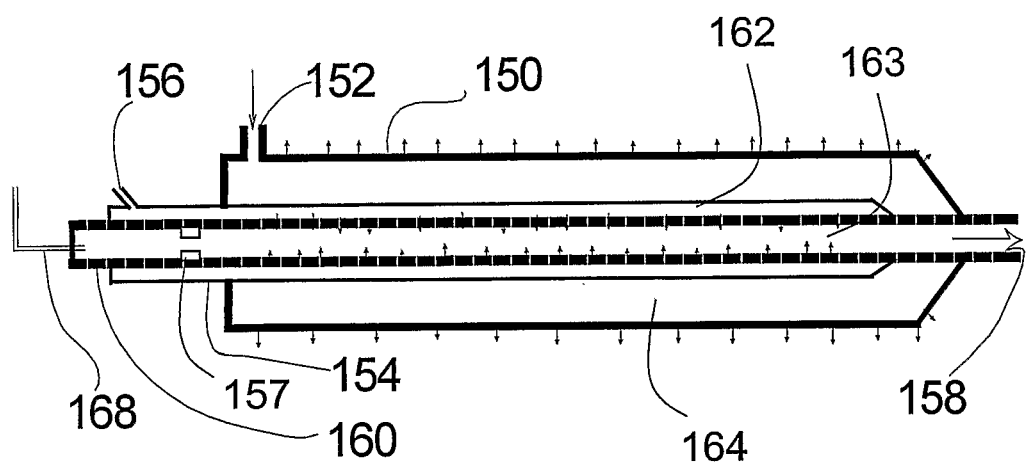
FIG. 8 is a schematic sectioned side view of the second embodiment of the combustion heater, modified so that flame burning occurs in a combustion fuel chamber of the heater.

Referring to FIGS. 7-8, a second embodiment of the combustion heater 14 is comprised of multiple concentrically arranged tubes that define separate chambers for reactant air flow, combustion air flow, and combustion fuel flow. Referring to FIG. 7, the combustion heater 14 comprises a porous outer tube 150, a dense middle tube 154 located coaxial to and within the outer tube 150; and a porous inner tube 160 located coaxial to and within the middle tube 154. The annular space between the outer and middle tubes 150, 154 define a reactant air heating chamber 164. The annular space between the middle and inner tubes 154, 160 defines a combustion air chamber 162. The space inside the inner tube 160 defines a combustion fuel chamber 163. Combustion fuel and air are controllably mixed and combusted in the combustion air chamber 162 to generate heat which radiates and conducts outwards to heat air flowing through the reactant air heating chamber 164.

The inner tube 160 is closed at one end and open at its opposite end ("fuel inlet end"). The fuel inlet end is fluidly coupled to a combustion fuel conduit 168 which transmits unreacted exhaust fuel from the fuel cells 12, as will be described in further detail below. Pressurized combustion fuel is supplied through the fuel inlet end, fills the combustion fuel chamber 163, and flows radially out of the combustion fuel chamber 163 through pores in the inner tube 160; the pore size is selected to be small enough to produce uniform radial flow along the length of the inner tube 160. The radially discharged fuel mixes with combustion air inside the combustion air chamber 162, which receives air from a radial air inlet 156 located at one end of the middle tube 154. In order for fuel to be able to flow into the combustion air chamber 162, the combustion air pressure is kept lower than the combustion fuel pressure; the pressure differential between the air and fuel flows can be controlled to control the flow of fuel into the combustion air chamber 162. A spark igniter 157 or other suitable igniter is mounted around the outside of and near the inlet end of the inner tube 160; the igniter 157 creates a flame on the outside surface of the inner tube 160 at the inlet end, which quickly propagates along the length of the tube 160. Heat generated from combustion is radiated and conducted outwards from the middle tube and into the reactant air heating chamber 164, heating the air therein. Combustion products are exhausted from the combustion air chamber 162 via an air outlet 158 located at the end of the middle tube 154 opposite the air inlet 156.

Reactant air enters the reaction air chamber 164 via a radial air inlet 152 at one end of the reactant air heating chamber 164. Heated air is discharged radially through the pores of the outer tube 150. Alternatively, the outer tube 150 can be dense (not shown) and a heated reactant outlet is provided which discharges heated reactant air from the reactant air chamber 164 and to a conduit which is in fluid communication with one or more of the cathode layers of the fuel cells 12.

Alternatively, the middle tube 154 can be porous and the air inlet 156 can be omitted; in such case, some of the reactant air permeates through the middle tube 154 to serve as combustion air in the combustion air chamber 162.

Referring to FIG. 8, combustion air can be fed into the combustion air chamber 162 at a pressure that is higher than the pressure at which fuel is supplied to the combustion fuel chamber 163. Due to the pressure differential, combustion air will permeate through the inner tube 160 and into the combustion fuel chamber 163. In this case, the spark igniter 157 is located on the inside surface of the inner tube 160 at its inlet end, and is used to start a flame which propagates along the length of the tube 160. Unlike the combustion heater 14 shown in FIG. 7, the inner tube 160 shown in FIG. 8 is open at its end opposite the inlet end, and the middle tube 154 is closed at its end opposite the inlet end. Therefore, combustion products are exhausted from the combustion fuel chamber 163 out of the outlet end of the inner tube 160.

Figure 9A:
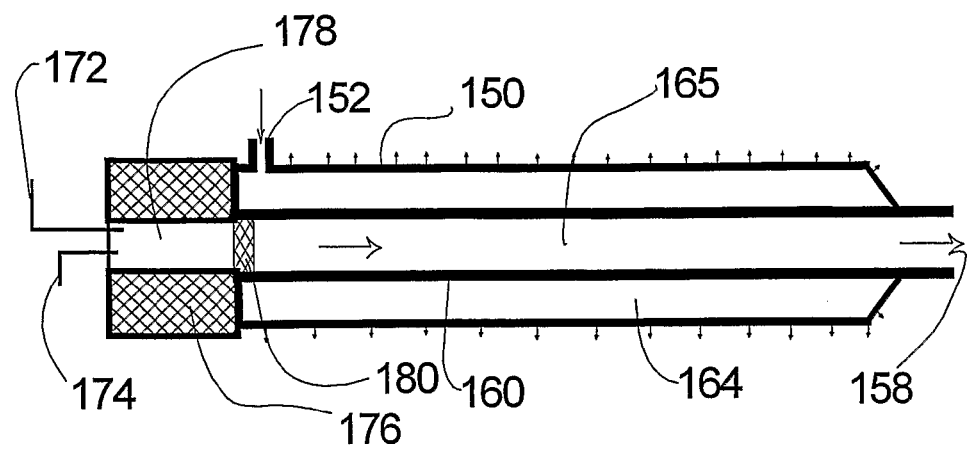
FIGS. 9(a) and 9(b) are schematic sectioned side views of a third embodiment of the combustion heater, having a plurality of concentrically arranged tubes that define a plurality of fluid flow chambers, a fuel/air pre-mixer fluidly coupled to the upstream end of the heater, and a flame arrestor either occupying part of (FIG. 9(a)) or all of (FIG. 9(b)) a combustion chamber in the heater.
Figure 9B:
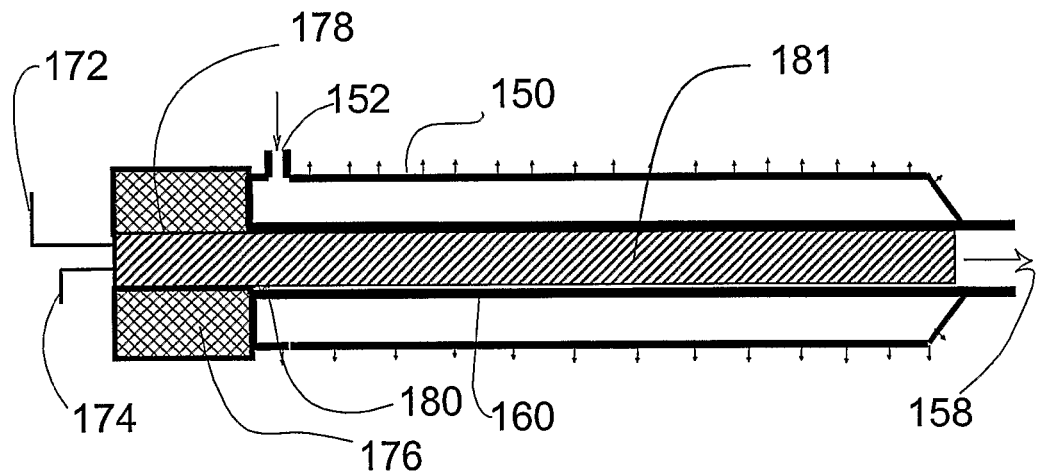

Referring to FIG. 9(a), a third embodiment of the combustion heater 14 comprises a pair of concentrically arranged tubes, namely the porous outer tube 150 and the dense inner tube 160, and a fuel/air pre-mixer 178 coupled to an inlet end of the inner tube 160. The annular space between the inner tube 160 and outer tube 150 defines a reactant air heating chamber 164, and the space inside the inner tube 160 defines a combustion chamber 165. The inside surface of the inner tube 160 is coated with catalytic material. Combustion fuel supply line 172 and combustion air supply line 174 are coupled to the pre-mixer 178 and supply combustion fuel and air to the pre-mixer 178. The fuel and air are mixed in the pre-mixer 178, and mixed fuel and air are discharged into the combustion chamber 165, where the fuel/air mixture is catalytically combusted. The length of the pre-mixer region is selected so that diffusion is sufficient for mixing. Combustion can also occur within the premixer 178, and thermal insulation 176 is wrapped around the premixer 178 to prevent the surrounding area from overheating. A porous flame arrester wall 180 is installed between the premixer 178 and combustion chamber 165 to prevent flame formed inside the premixer from extending into the combustion chamber. Referring to FIG. 9(b), a porous material such as a solid state foam matrix 181 or another suitable flame arrestor material fills the combustion chamber; the pores of the matrix 181 are smaller than the quenching diameter of the fuel in use, thereby serving to prevent any flame from forming inside the premixer 178 or combustion chamber 165.

Heat produced by combustion inside the combustion chamber 165 is radiated and conducted into the air heating chamber 164, thereby heating the reactant air therein. The heated air passes through the pores in outer wall 150, to heat the air and fuel cells 12 outside of the heater 14. Alternatively, the outer wall 150 can be dense and a heated air outlet is provided which discharges heated air out of the air heating chamber 164 into a conduit which is in fluid communication with one or more of the cathodes of the fuel cells 12.

Figure 10:
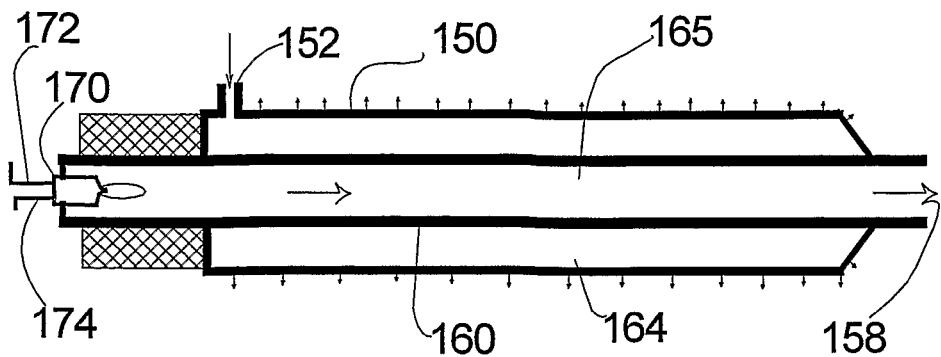
FIG. 10 is a schematic sectioned side view of a fourth embodiment of the combustion heater, having a plurality of concentrically arranged tubes that define a plurality of fluid flow chambers, and a flame burner mounted at an inlet end of the heater.

Referring to FIG. 10, a fourth embodiment of the combustion heater 14 also comprises a pair of concentrically arranged tubes, namely the porous outer tube 150 and the dense inner tube 160, and a flame burner 170 coupled to an inlet end of the inner tube 160. The annular space between the inner tube 160 and outer tube 150 defines the reactant air chamber 164, and the space inside the inner tube 160 defines the combustion chamber 165. Thermal insulation 176 is wrapped around a portion of the inner tube 160 closest in proximity to the flame burner 170. Combustion fuel supply line 172 and combustion air supply line 174 are coupled to the burner 170 and supply combustion fuel and air to the burner 170. The burner 170 is provided with a spark or other suitable igniter that ignites at least some of the fuel and air to produce a flame. Any unburned fuel and air flow into the combustion chamber 165; the inner wall of the combustion chamber can be coated with catalytic material to promote the fuel and air therein to combust. The resulting heat generated from the flame and catalytically combusted fuel and air is radiated and conducted into the reaction air chamber 164 to heat the air therein. Combustion products are exhausted through the inner tube outlet 158.

Figure 11:
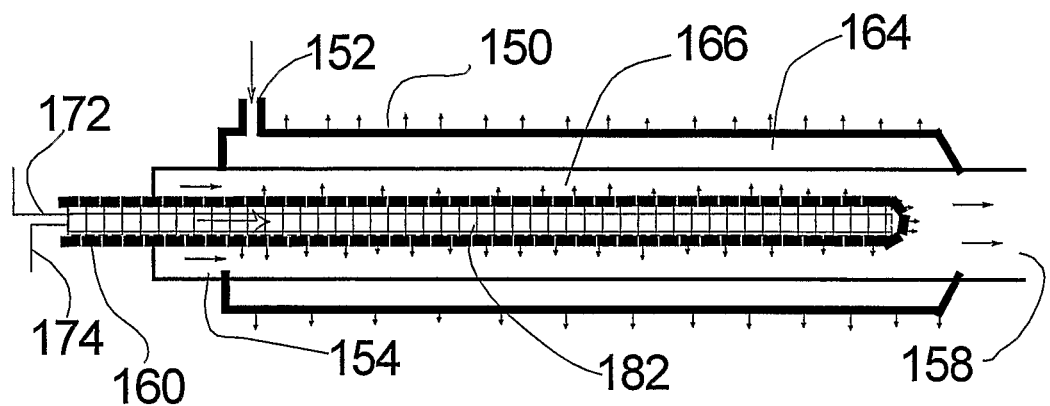
FIG. 11 is a schematic sectioned side view of a fifth embodiment of the combustion heater, having a plurality of concentrically arranged tubes that define a plurality of fluid flow chambers, including a reactant air heating chamber and a combustion chamber that receives a fuel/air mixture for flame and/or catalytic burning.

Referring to FIG. 11, a fifth embodiment of the combustion heater 14 comprises the porous outer tube 150, the dense middle tube 154 located coaxial to and within the outer tube 150, and the porous inner tube 160 located coaxial to and within the middle tube 154. The annular space between the outer and middle tubes 150, 154 defines the reaction air chamber 164. The annular space between the middle and inner tubes 154, 160 defines a first combustion chamber 166. The space inside the inner tube 160 defines a second combustion chamber 182. Combustion air and fuel are supplied to and mixed at the inlet end of the inner tube 160. Porous flame arrestor material fills the second combustion chamber 182; the pore size is smaller than the quenching diameter of the fuel in use, e.g. about 0.5 mm or less when using hydrogen fuel. Suitable combustion catalyst with catalyst support such as barium hexa-aluminate nanofibers coats the pores of the inner tube 160. The spark igniter (not shown) is mounted in the first combustion chamber 166 and operates to ignite a flame, which propagates along the outer surface of the inner tube 160. The flame serves to heat up the catalyst to its operating temperature, thereby initiating catalytic burning. After catalytic burning beings, the burner flame will go out automatically as it will become starved of reactants.

Alternatively, the fifth embodiment of the combustion heater 14 can be operated as a flame burner only with no catalytic burning; in such case, no catalyst coating is provided on the inner tube 160, and heat is provided solely from flame in the compartment 166. Alternatively, the fifth embodiment of the combustion heater 14 can be operated as a catalytic burner only with no igniter, in which case catalytic material that is active at room temperature is used.

As another alternative, the fifth embodiment can be modified to exclude the outer tube 150 and reactant air chamber 164; in such case, heat transfer occurs by radiation and conduction/convection to the nearby fuel cells 12. This modified heater 14 can be operated as a flame burner, catalytic burner, or both.

Figure 12:
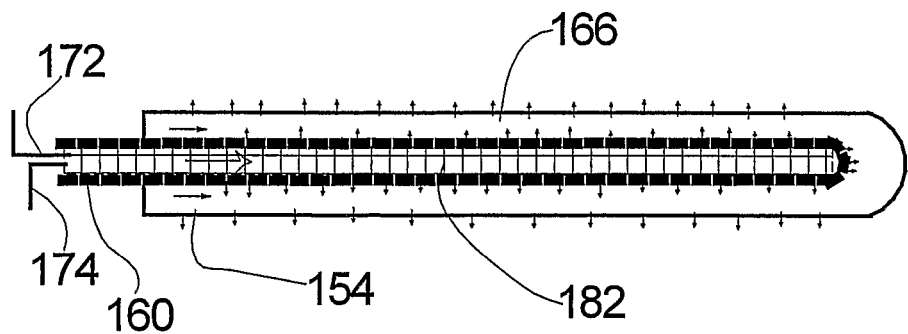
FIG. 12 is a schematic sectioned view of a sixth embodiment of the combustion heater, having a plurality of concentrically arranged tubes that define a plurality of fluid flow chambers, including a combustion chamber that receives a fuel/air mixture for flame and/or catalytic burning.
Figure 13:
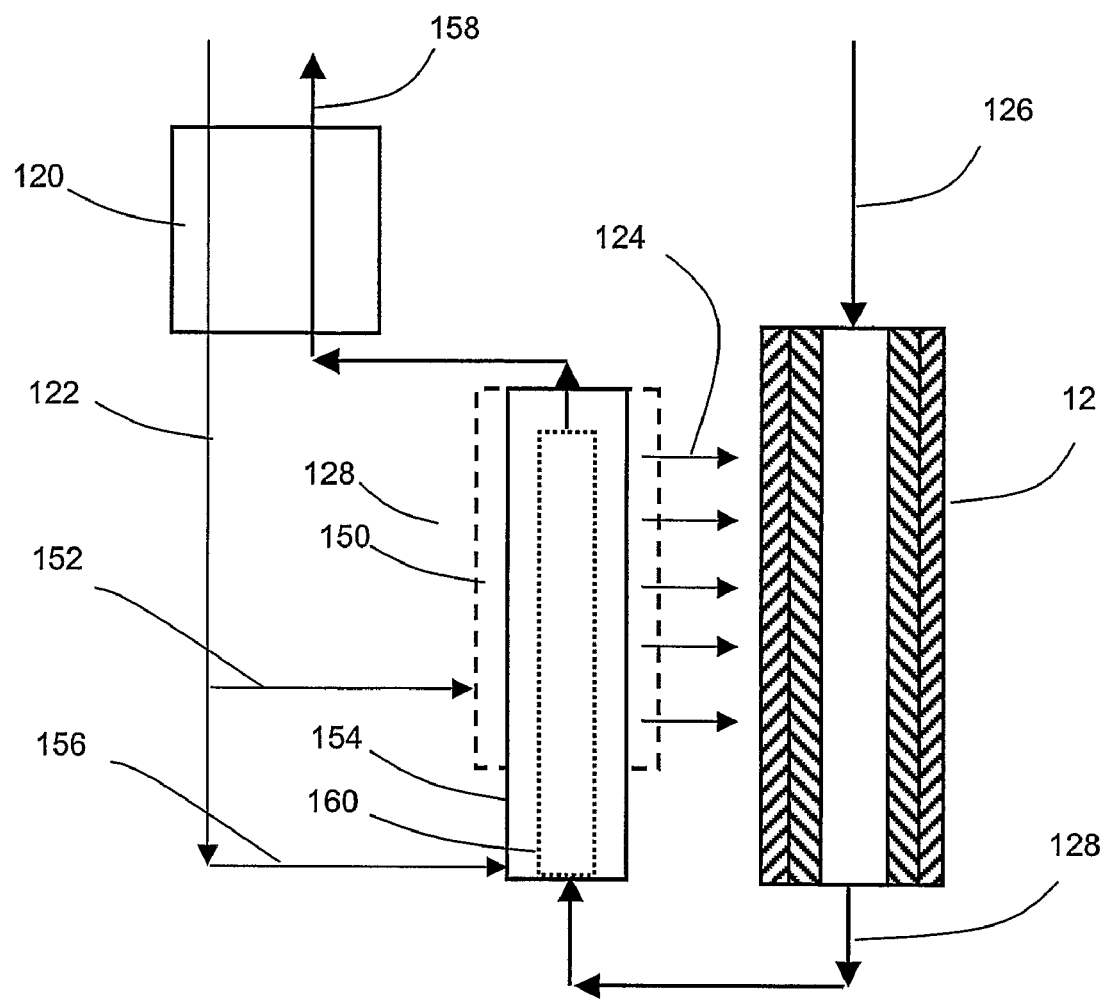
FIG. 13 is a block diagram illustrating the air and fuel flow paths within a fuel cell system having a fuel cell and one of the combustion heaters of FIGS. 1, 7-12.

Referring to FIG. 12, a sixth embodiment of the combustion heater 14 comprises a pair of concentrically arranged tubes, namely the middle tube 154 and the inner tube 160. The annular space between the two tubes 154 and 160 define the first combustion chamber 166 and the space inside the inner tube 160 defines the second combustion chamber 182. Flame arrestor material fills the second combustion chamber 182. Fuel and air are supplied to and mixed at the inlet end of the inner tube 160. The middle tube 154 is porous and acts as a flame arrestor so that the flame stays within the first combustion chamber 166. Both ends of the middle tube 154 are sealed, thereby causing combustion products to exhaust radially through the middle tube 154. This is expected to produce a very uniform axial temperature profile. The combustion heater 14 can be operated as a flame burner only (no catalytic material), a catalytic burner only (no igniter, use of room temperature activated catalytic material), or both (the igniter shuts off after catalytic burning starts). This embodiment optimally requires a fuel-air mixture with excess air so that the combustion exhaust exiting radially into the fuel cell region contains enough residual oxygen to serve as at least part of the reactant air supply Referring now to FIG. 13, each of the first to sixth embodiments of the combustion heater 14 can be fluidly coupled to other components in the fuel cell system 10 to efficiently make use of the heat generated by the combustion heater 14 and fuel cells 12. An air supply conduit passes 122 through a heat recuperator 120, and supplies reactant air to the annular chamber 18 via the air inlet 25 in the first an sixth embodiments, and to the reactant air chamber via air inlet 152 in the second to fifth embodiments. The air supply conduit 122 also supplies combustion air to the burner 35 in the first embodiment, to the combustion air chamber via inlet 156 in the second embodiment, to the premixer 178 in the third embodiment via air supply line 174, to the burner 170 in the fourth embodiment also via air supply line 174, and to the combustion chambers of the fifth and sixth embodiments also via air supply lines 174. A fuel supply conduit 126 supplies fuel to the anode portions of the fuel cells 12; an unreacted fuel conduit 128 receives unreacted fuel from the fuel cells 12 and supplies the unreacted fuel to the burner 35 of the first embodiment, to the combustion fuel chamber of the second embodiment via combustion fuel conduit 168, to the premixer 178 via fuel supply line 172 in the third embodiment, to the burner 170 also via fuel supply line 172 in the fourth embodiment, and to the combustion chambers of the fifth and sixth embodiments also via fuel supply line 172. Air and fuel are both supplied via supply inlets 172, 174 to the combustion chamber in the fifth and sixth embodiments.

At start up, the fuel cells 12 are below their operating temperature, and thus, all the fuel discharged from the fuel cell is unreacted and fed into the combustion heater 14; whether the combustion heater uses a burner 14 as in the first or fourth embodiments, or an igniter as in the second embodiment, or catalysts that are active at room temperature as in the third embodiment, the fuel and air are combusted and heat is generated within the combustion heater 14. Heat radiates and conducts outwards to heat the reactant air and surrounding components, and hot exhaust products from the combustion heater 14 are discharged via a discharge conduit 158, which passes through the heat exchanger 120, wherein heat is transferred to the supply air passing through the supply air conduit 120.

Once the fuel cells are heated to within the operating temperature range, electricity is generated, fuel and air are consumed, and byproduct heat is generated by the fuel cells 12. Valves (not shown) can be installed and controlled in the system 10 to control the flow of fuel and air to the combustion heater, e.g. to reduce the flow of fuel and/or air to the combustion heater once the fuel cells have reached their operating temperatures. In particular, several operating strategies can be employed to control the temperature of the fuel cell system 10:

1) stop or reduce production of heat in the combustion heater 14 by
   a) stopping the air supply to the combustion heater 14 by stopping flow of air through conduits 31, 156 and 174; when using exhaust air from the fuel cell, directing the exhaust air directly to the heat exchanger 120 using a bypass conduit (not shown);
   b) stopping fuel supply to the combustion heater 14 (the unused fuel can recirculated to the fuel cells 12 for reacting)
2) increase supply air flow rate through the fuel cell system 10 to remove the excess heat;
3) bypass air around the heat exchanger 120 using a bypass conduit (not shown), so that the fuel cells 12 will be fed with reactant air at a lower temperature; or
4) Reduce the fuel flow to the fuel cells 12, so that the fuel cells 12 produce less electrical power and less heat. In this case, the amount of fuel available to the combustor also will be reduced, and the combustion heater will also generate less heat.

Figure 14:
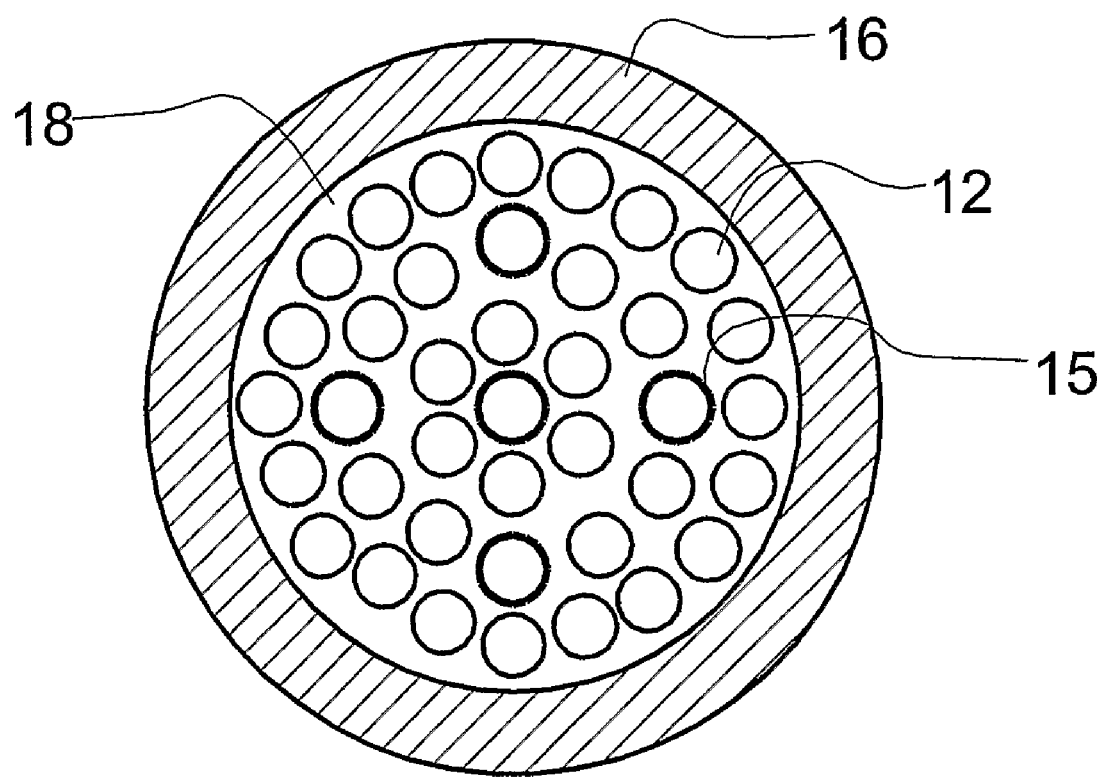
FIG. 14 is a schematic end view of a fuel cell stack of a plurality of tubular fuel cells and combustion heaters packed within a thermal casing, according to an another embodiment of the invention.

According to another embodiment of the invention, and referring to FIG. 14, multiple fuel cells 12 and multiple tubular combustion heaters 14 are stacked together in an annular chamber 18 inside a thermal casing 16. The combustion heaters 14 are strategically placed amongst the fuel cells 12 in order to provide a uniform distribution of heat to the fuel cell stack. Any of the six embodiments of the combustion heaters 14 described above can be used here.

The combustion heaters 14 can use unreacted exhaust fuel and oxygen supplied from air distributed throughout the stack to generate heat. In this connection, oxygen supply conduits (not shown) are connected to the air outlet end of the annular chamber 18 and to the inside of each combustion heater 14, to enable exhaust air to flow to each combustion heater 14. Alternatively, fresh air can be supplied directly to each combustion heater 14. Similarly, fuel supply conduits (not shown) are connected to the fuel outlets of each fuel cell 12 and to the inside of each combustion heater 14 to enable exhaust fuel to flow to the each combustion heater 14.

Figure 15A:
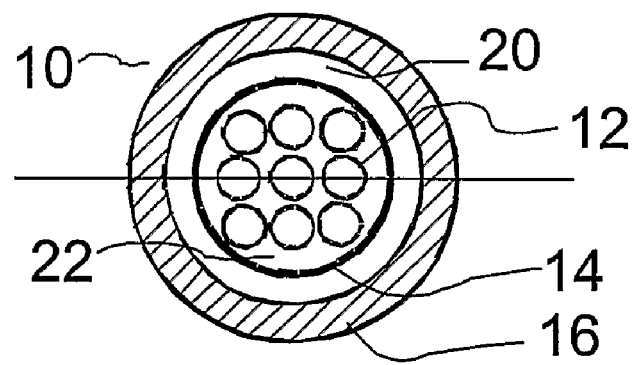
FIGS. 15(a) and (b) are schematic top and side sectioned views of a fuel cell system according to yet another embodiment of the invention.
Figure 15B:
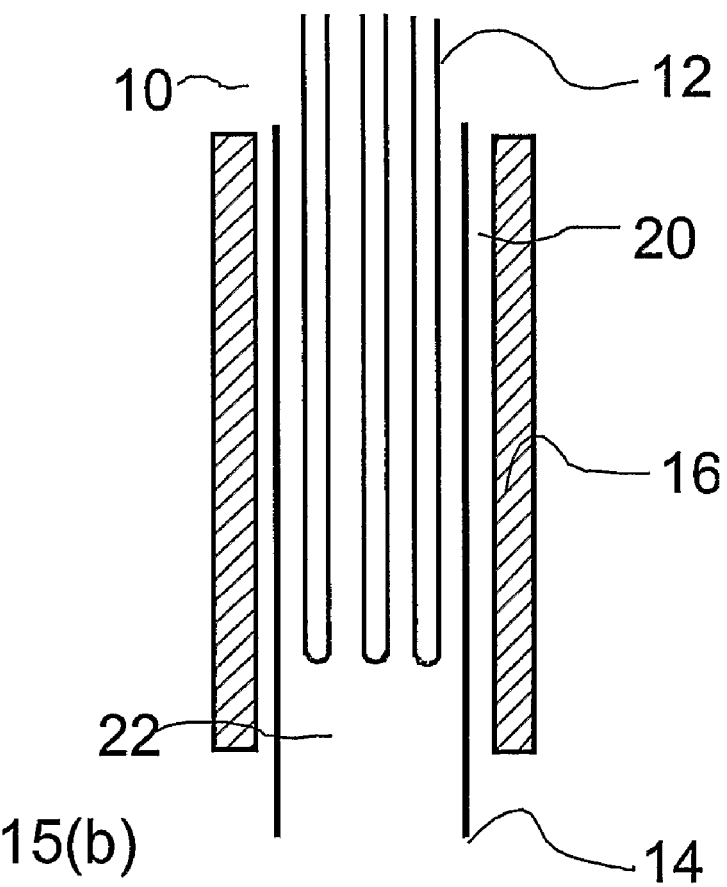

According to another embodiment of the invention and referring to FIGS. 15(*a*) and (*b*), a fuel cell system 10 is provided with a combustion tube 15 that is large enough to locate multiple fuel cells 12 inside the combustion tube 15. The space between the combustion tube 15 and casing 16 is now defined as the heating chamber 20, and the space inside the combustion tube 15 is now defined as the oxidant flow chamber 22. Reactant fuel and oxidant supply and discharge connections are configured such that reactant fuel is supplied to and removed from each fuel cell 12 inside the oxidant flow chamber 22, reactant air is supplied to and removed from the oxidant flow chamber 22, and combustion fuel and air is introduced into the heating chamber 20 and combusted to produce heat that is used to heat the oxidant and the fuel cells 12 inside the chamber 18. In effect, the heating chamber 20 serves as a combustion heater for this fuel cell system 10.

Like the tubular combustion heater 14 of first embodiment, the combustion tube 15 can be made of a porous or dense material that can withstand SOFC operating conditions, such as a ceramic, high temperature metal, metal alloy, cermets, or a high temperature metal or metal alloy mesh. To enhance catalytic burning, both the inner surface of the casing 16 and the outer surface of the combustion tube 15 are coated with catalytic material.

Optionally, the heating chamber 20 is filled with a solid-state porous foam matrix (not shown) that is able to withstand SOFC operating conditions; the maximum pore size of the foam is selected to be smaller than the quenching diameter of the fuel in use. As a result, the foam matrix serves a flame arrestor to stop the formation and propagation of any flame that may form inside the heating chamber 20. Alternatively, the flame arrestor can be a cylindrical wire screen (not shown) or another suitable porous material that is placed in the heating chamber 20 such that the heating chamber is divided into two annular compartments (not shown). A fuel-air mixture is introduced into one of the compartments (first compartment), and flow radially through the wire screen, and into the other compartment (second compartment). A flame will form in this other compartment, and heat will be generated. Spent fuel-air is exhausted from this other compartment. The thickness of the first compartment is selected in combination with the thickness, pore size, and porosity of the wire screen so as to ensure a uniform distribution of flow and flame along the length of the chamber 20. The thickness of the second compartment must be larger than the quenching diameter of the fuel-air mixture in use, e.g. 0.75 mm for hydrogen-air, and also must be large enough that the gas velocity at the exhaust end of the second compartment is not higher than the flame velocity of the fuel-air mixture, e.g. 3 m/s for hydrogen-air, or else the flame will blow off in that region. The first compartment can be the inner or outer compartment inside the chamber 20.

Alternatively, a cylindrical porous catalytic separator (not shown) can be introduced into the heating chamber 20 in the same location as the flame arrestor described above. The separator is composed of a porous material whose internal surface area is coated with catalyst support and catalyst as for the other embodiments. An igniter or electric heater can be provided that will ignite the fuel-air mixture to create a flame, which heats the catalyst until fully lit. Once catalytic burning occurs, the flame will go out due to reactant starvation.

Figures 16A, 16B:
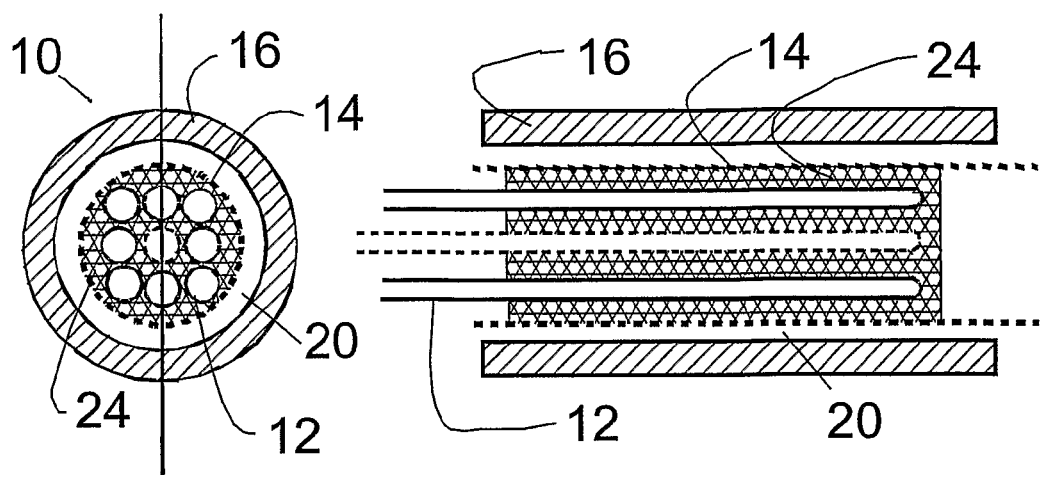
FIGS. 16(a) and (b) are schematic top and side sectioned views of a modified version of the fuel cell system of FIGS. 15(a) and (b) in which the fuel cells are embedded in a solid state porous foam matrix.

Also optionally, and now referring to FIGS. 16(a) and (b), the fuel cells 12 can be embedded in a solid-state porous foam matrix 24 that has sufficient mechanical strength to support the fuel cells 12 in the system 10. The porous foam matrix 24 can be made of a material that is electronically conductive, in which case the foam matrix 24 acts as a current collector and also can act as a catalyst support for the cathode catalyst in each fuel cell 12.

Figure 17A:
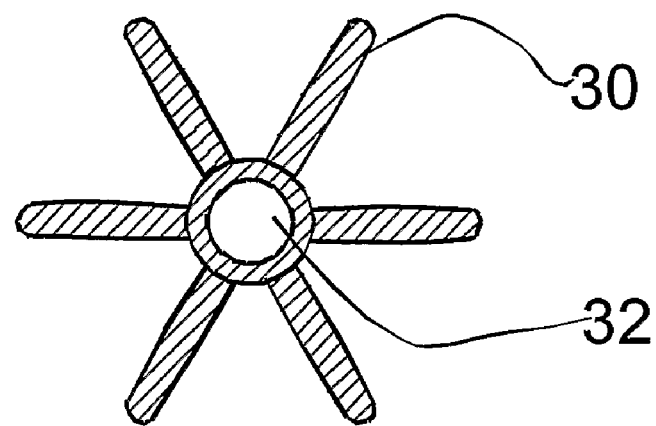
FIGS. 17(a) and (b) are schematic top and side views of a fuel cell stack separator according to yet another embodiment of the invention.
Figure 17B:
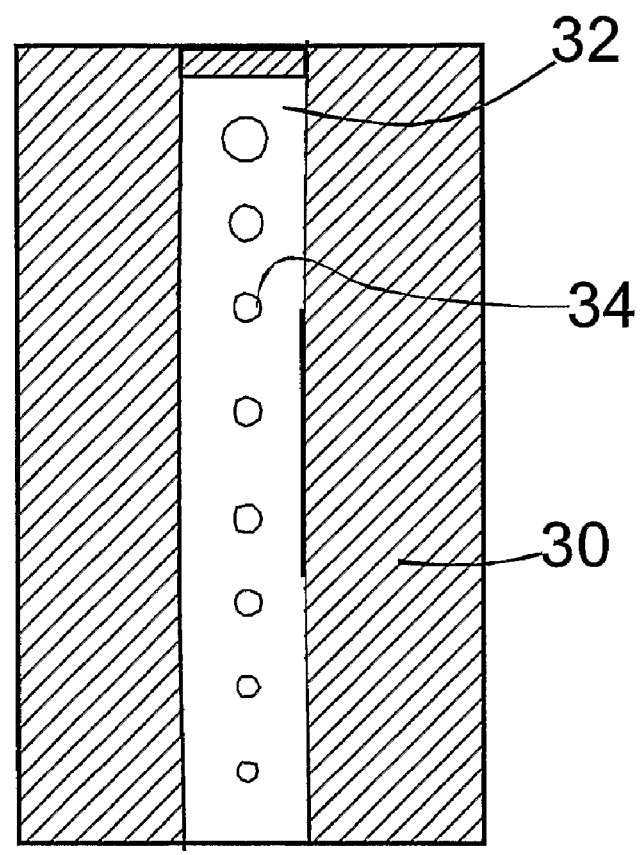
Figure 18:
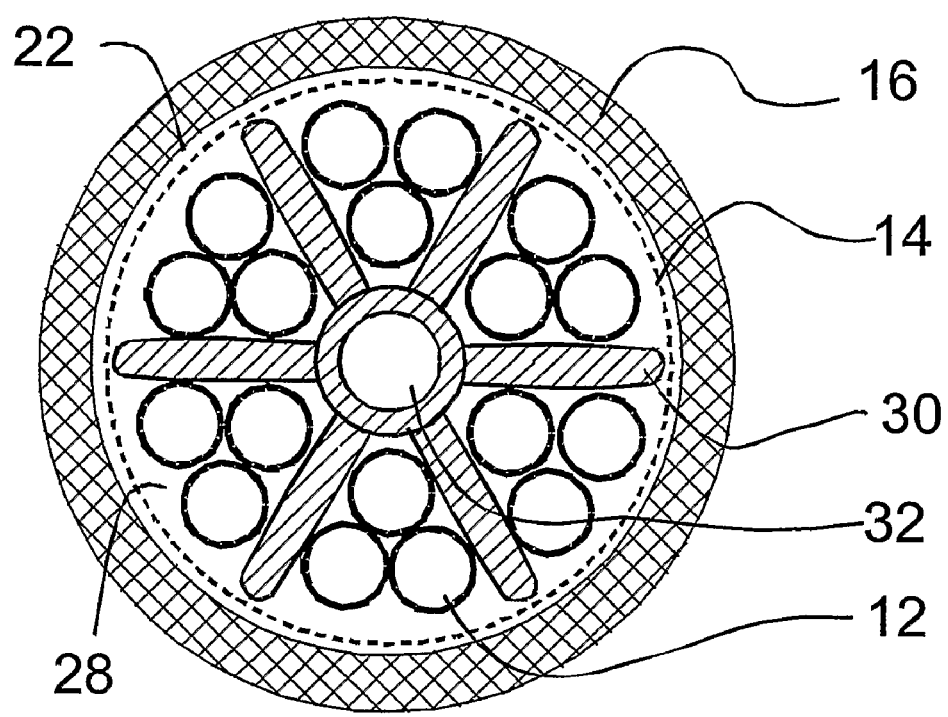
FIG. 18 is a schematic top view of the fuel cell stack separator of FIGS. 17(a) and (b) installed in a fuel cell system.

Referring now to FIGS. 17(a) and (b) and 18 and according to another embodiment of the invention, the fuel cells 12 are divided into electrically isolated groups of "sub-stacks" 28. Longitudinally-extending planar partitions 30 are used to divide the fuel cells 12, and are made of a material that is able to withstand SOFC operating conditions. Such materials include ceramics such as SiC, $Al_2O_3$, $SiO_2$, MgO, $ZrO_2$, high temperature metals or metal alloys, cermets, ceramics coating with metals or metals coating with ceramic. When an electrically conductive metal is used in the partitions 30, the metal can be coated with an electrically insulating material to prevent shorting.

One longitudinal edge ("inside edge") of each partition 30 is attached to the outer surface of a longitudinally extending air distribution tube 32. The other longitudinal edge of each partition 30 extends close to the inner surface of the combustion heater 14. The partition wall 30 can be perforated or dense.

The air distribution tube 32 has a plurality of longitudinally spaced perforations 34 that discharge air from the air distribution tube 32 and to the cathode of each fuel cell 12. Air is supplied into the bottom of the tube 32 from an air source (not shown) and flows upwards and out of each perforation 34. In order for air to be discharged at a relatively uniform rate along the length of the tube 32, the perforations 34 increase in diameter upwards along the tube 32, to compensate for a decreasing air pressure upwards along the tube 32. Alternatively or in addition, the air distribution tube wall can be sufficiently porous to allow the passage of air therethrough.

In operation, the partitions 30 serve to electrically isolate each fuel cell sub-stack 28 from another, but allows the flow of air between the sub-stacks 28. This electrical isolation enables the sub-stacks 28 to be electrically connected in series. Current is collected from the ends of each fuel cell 12 in the sub-stacks 28.

Alternatively, the partitions 30 can be electrically conductive such that all of the sub-stacks 28 are electrically connected in parallel. Also alternatively, the partitions 30 can be provided without the air distribution tube 32, in which case the inside edges of the partitions 30 extend inwards to contact each other.

Instead of or in addition to supplying air to the cathodes, the air distribution tube 32 can be used to heat reactant air and the fuel cells 12, by burning heating fuel inside the air distribution tube 32 to produce heat. In such case, the combustion heater 14 according to one of the sixth aforementioned embodiments can be substituted for the air distribution tube 32. Heat can also be supplied to the fuel cells 12 by burning fuel in the heating chamber 22 between the combustion heater 14 and casing 16, as described in the second embodiment.

Figure 19A:
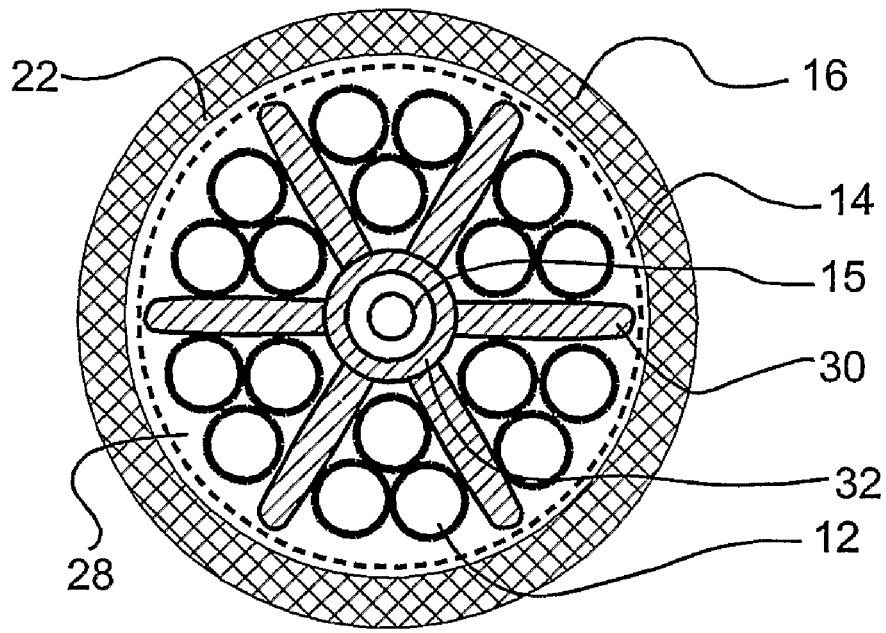
FIGS. 19(a) and (b) are schematic top views of the fuel cell system of FIG. 18 with an inner and outer heating tube (FIG. 19(a)) and an inner heating tube only (FIG. 19(b)).
Figure 19B:
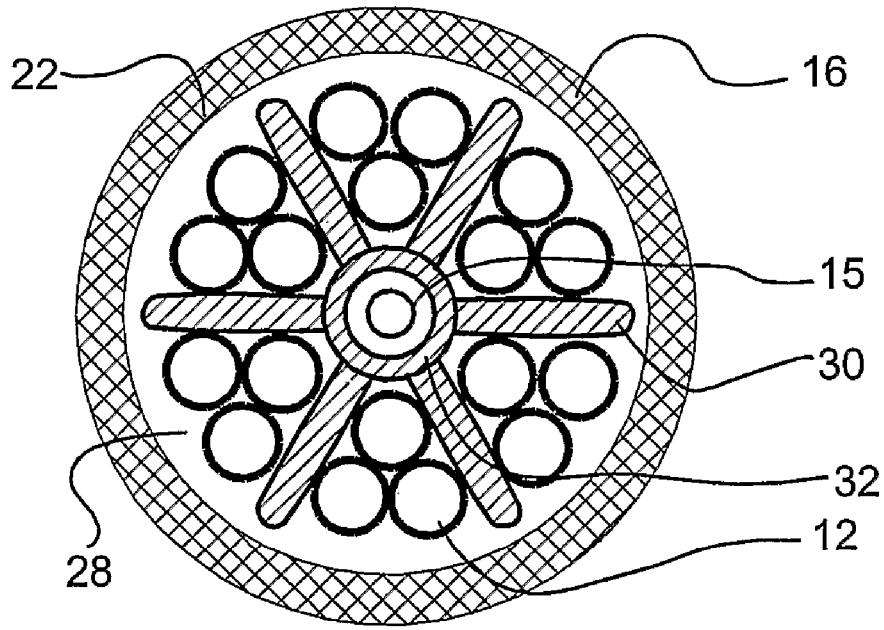

According to another embodiment of the invention and referring to FIGS. 19(a) and (b), an inner tubular combustor 15 is coaxially mounted inside the tubular air distribution tube 32. The combustor 15 is fluidly coupled to respective fuel and air sources and operates in the same manner as described above. As the tubular combustor 15 is spaced from the air distribution tube 32, an annular air flow channel is formed there between through which supply air or exhaust air can be flowed. This type of arrangement is expected to enhance heat transfer from the combustor 15 to the fuel cell stack 12 and also enable uniform air distribution within the stack 12. Optionally, the air distribution tube 32 can have multiple combustor tubes (not shown) to improve the heat transfer to the annular air flow channel. The combustion heater 14 can be present to provide additional heat to the stack 12, as shown in FIG. 19(a), or omitted, as shown in FIG. 19(b).

Figure 20A:
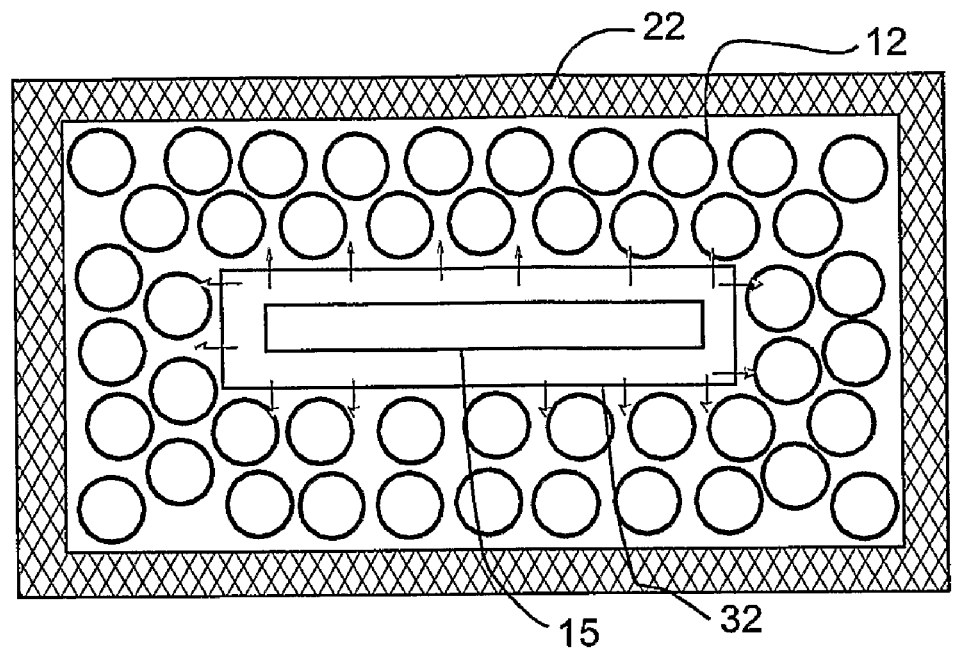
FIGS. 20(a)-(d) are schematic top views of fuel cell systems according to other embodiments of the invention, each of the four systems having different combustor designs.
Figure 20B:
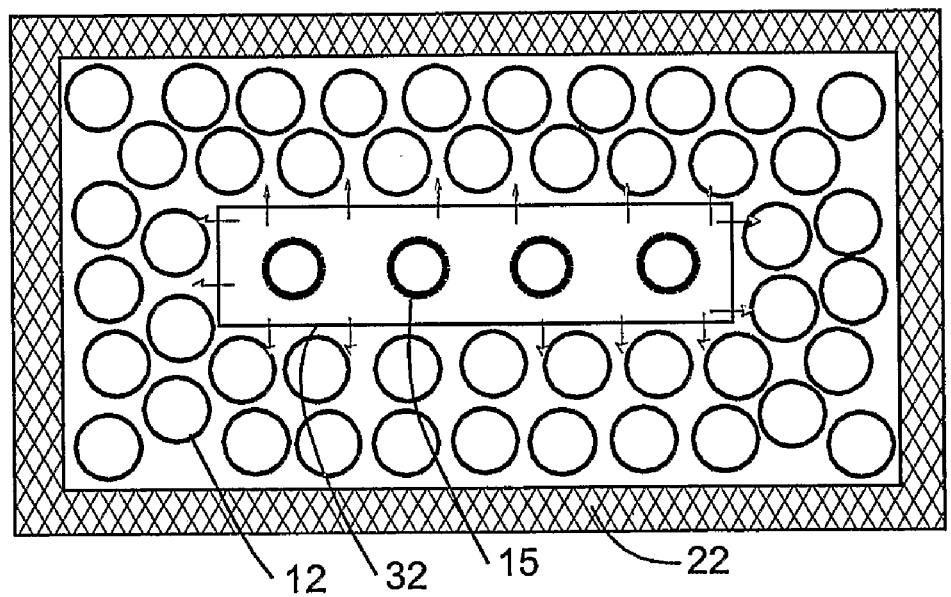
Figure 20C:
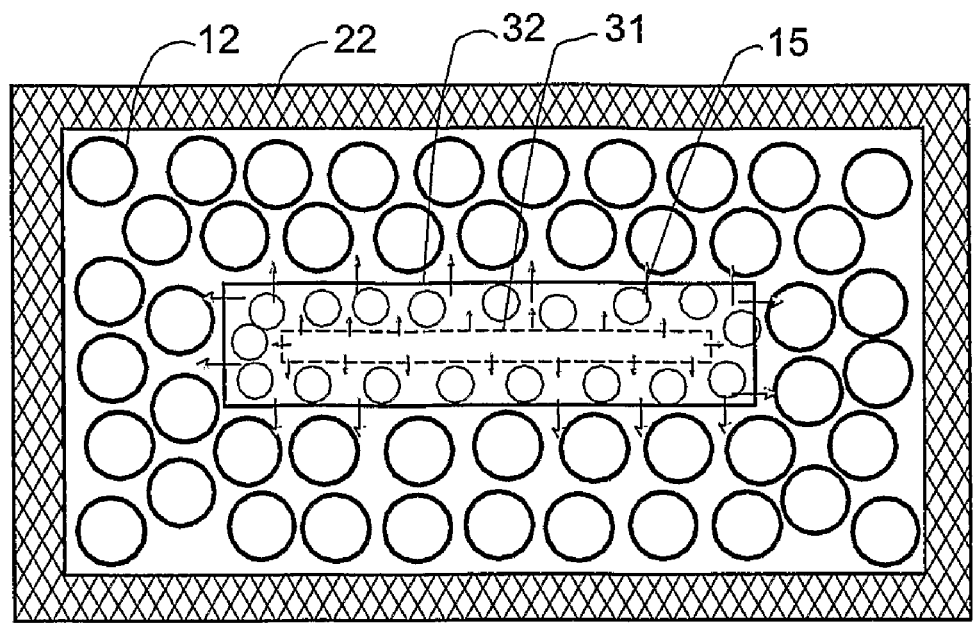
Figure 20D:
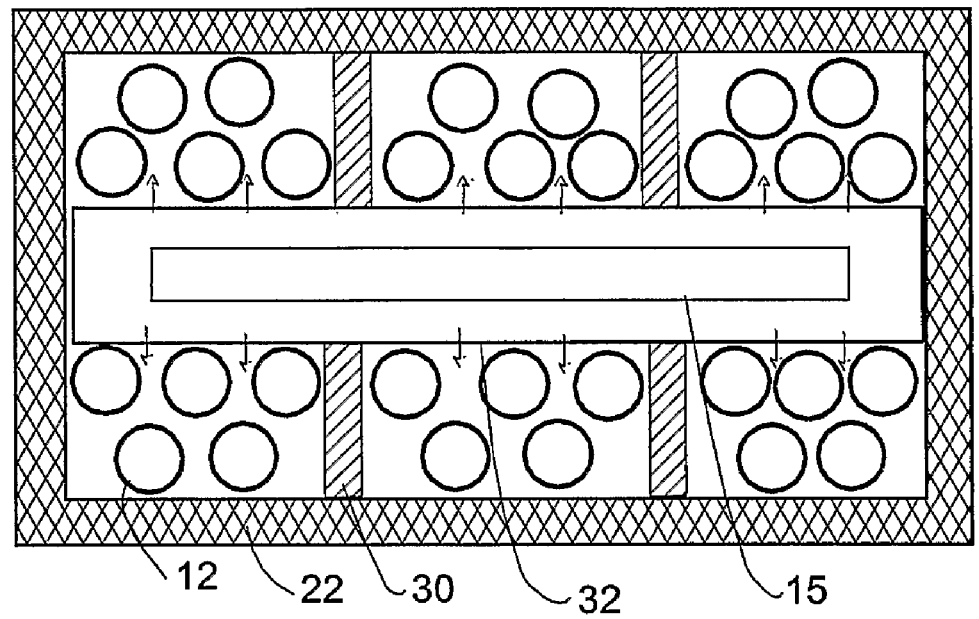

According to another embodiment and referring to FIGS. 20(a)-(d), the fuel cell system 10 can have a rectangular cross-sectional shape, which is particularly useful for portable applications like laptop computers. The system 10 has a combustor 15 enclosed within an air distribution tube 32—the arrows in FIGS. 20(a)-(d) indicate air flow. The combustor 15 can have various designs: in FIG. 20(a), the combustor 15 is an elongated rectangular structure; in FIG. 20(b), the combustor 15 comprises multiple longitudinally extending heating tubes having the same design as one of the first to sixth embodiments of the heater 14 previously described; in FIG. 20(c), the combustor 15 comprises multiple longitudinally extending heating tubes surrounding a longitudinally extending air inlet tube 31 that serves to enhance heat transfer between the combustor 15 and the air. In FIG. 20(d), the fuel cells 12 are electrically isolated into a plurality of substacks, and the combustor is the elongated rectangular structure as shown in FIG. 20(a).

While the present invention has been described herein by the preferred embodiments, it will be understood to those skilled in the art that various changes may be made and added to the invention. The changes and alternatives are considered within the spirit and scope of the present invention.

What is claimed is:

1. A solid oxide fuel cell system comprising:
   (a) at least one tubular solid oxide fuel cell comprising a ceramic solid state electrolyte layer and inner and outer electrode layers concentrically arranged around and sandwiching the electrolyte layer, the inner electrode layer fluidly communicable with only one of an oxidant reactant and a fuel reactant, and the outer electrode layer fluidly communicable with only the other of the oxidant and fuel reactants; and
   (b) a combustion heater fluidly communicable with the oxidant and fuel reactants such that combustion can occur, the heater mounted in sufficient thermal proximity to the fuel cell that the fuel cell can be heated by the combustion to an operating temperature, the heater comprising a porous outer tube and a porous inner tube within the outer tube, an inside of the inner tube defining an inner combustion chamber fluidly communicable with the oxidant and fuel reactants which form a mixture therein, and an annular space between the inner and outer tubes defining an outer combustion chamber in which fuel and oxidant mixture radially permeating through the inner tube is combusted, the outer tube sufficiently porous to enable the fuel and air reactants to pass through the outer tube.

2. A system as claimed in claim 1, further comprising:
   a tubular thermal casing, the inside of which defines a first reactant chamber that contains the at least one fuel cell and the heater, and can contain the reactant that is fluidly communicable with the outer electrode layer, wherein the pores of the outer tube of the heater are coated with catalytic material effective to combust a mixture of the air and fuel flowing through the outer tube.

3. A solid oxide fuel cell system comprising:
(a) at least one tubular solid oxide fuel cell comprising a ceramic solid state electrolyte layer and inner and outer electrode layers concentrically arranged around and sandwiching the electrolyte layer, the inner electrode layer fluidly communicable with only one of an oxidant reactant and a fuel reactant, and the outer electrode layer fluidly communicable with only the other of the oxidant and fuel reactants;
(b) a tubular combustion heater, the inside of which contains the at least one fuel cell, the heater fluidly communicable with the oxidant and fuel reactants such that combustion can occur; and
(c) a tubular thermal casing, the inside of which defines a first reactant chamber that contains the at least one fuel cell and the heater,
wherein the heater and casing are arranged to define an annular chamber therebetween that is fluidly communicable with an air and fuel mixture, and one or both of the heater and casing are coated with catalytic material effective to combust the air and fuel mixture.

4. A system as claimed in claim 3, wherein the inside of the tubular heater defines an oxidant chamber, and the system comprises the at least one fuel cell located within the oxidant chamber.

5. A system as claimed in claim 4 wherein the at least one fuel cell is embedded in a solid state porous foam matrix inside the oxidant chamber.

6. A solid oxide fuel cell system comprising
(a) at least one tubular solid oxide fuel cell comprising a ceramic solid state electrolyte layer and inner and outer electrode layers concentrically arranged around and sandwiching the electrolyte layer, the inner electrode layer fluidly communicable with only one of an oxidant reactant and a fuel reactant, and the outer electrode layer fluidly communicable with only the other of the oxidant and fuel reactants; and
(b) a combustion heater comprising a first tube, a dense second tube within the first tube, and a porous third tube inside the second tube, an annular space in between the second and third tubes defining a combustion air chamber, and an inside of the third tube defining a combustion fuel chamber, the combustion air chamber fluidly communicable with the oxidant and the combustion fuel chamber fluidly communicable with the fuel, the third tube sufficiently porous to enable the fuel and air reactants to pass through the third tube such that combustion can occur, and an annular space between the first and second tubes defining a reactant heating chamber fluidly communicable with one of the oxidant reactant and the fuel reactant and thermally coupled to the combustion air chamber such that heat generated from the combustion is transferable to the reactant inside the reactant heating chamber.

7. A solid oxide fuel cell system as claimed in claim 6 wherein the combustion fuel chamber is fluidly communicable with the fuel at a higher pressure than the combustion air chamber is fluidly communicable with the oxidant, thereby causing fuel to permeate radially through the third tube and into the combustion air chamber for combusting with the oxidant therein.

8. A solid oxide fuel cell system as claimed in claim 6 wherein the combustion fuel chamber is fluidly communicable with the fuel at a lower pressure than the combustion air chamber is fluidly communicable with the oxidant, thereby causing oxidant to permeate radially through the third tube and into combustion fuel chamber for combusting with the fuel therein.

9. A solid oxide fuel cell system comprising:
(a) at least one tubular solid oxide fuel cell comprising a ceramic solid state electrolyte layer and inner and outer electrode layers concentrically arranged around and sandwiching the electrolyte layer, the inner electrode layer fluidly communicable with only one of an oxidant reactant and a fuel reactant, and the outer electrode layer fluidly communicable with only the other of the oxidant and fuel reactants; and
(b) a combustion heater comprising a first tube, a dense second tube within the first tube and a porous third tube inside the second tube, an annular space in between the second and third tubes defining a first combustion chamber, and an inside of the third tube defining a second combustion chamber, the first combustion chamber having an exhaust outlet and the second combustion chamber fluidly communicable with the fuel and oxidant, the fuel and oxidant forming a mixture therein that permeates radially through the third tube and into the first combustion chamber for combusting, and an annular space between the first and second tubes defining a reactant heating chamber fluidly communicable with one of the reactants and thermally coupled to the first combustion chamber such that heat generated from the combustion is transferable to the reactant inside the reactant chamber.

10. A solid oxide fuel cell system as claimed in claim 9 further comprising an flame igniter in the first combustion chamber and effective to ignite the fuel and oxidant mixture therein for combustion by flame burning.

11. A solid oxide fuel cell system as claimed in claim 9 wherein the pores of the third tube are coated with a catalytic material sufficient to catalytically combust the oxidant and fuel mixture passing therethrough.

12. A system as claimed in claim 1 further comprising a flame igniter in the outer combustion chamber and effective to ignite the fuel and oxidant mixture therein for combustion by flame burning.

13. A system as claimed in claim 1 wherein the pores of the inner tube are coated with a catalytic material sufficient to catalytically combust the oxidant and fuel mixture passing therethrough.

14. A system as claimed in claim 2 further comprising a tubular flame arrestor surrounding the heater, the flame arrestor having pores or perforations with a maximum size that is smaller than the quenching diameter of the fuel.

15. A system as claimed in claim 4 further comprising a porous flame arrestor located in the annular chamber and having a maximum pore size smaller than the quenching diameter of the fuel-air mixture flowing through the annular chamber.

16. A system as claimed in claim 15 wherein the flame arrestor is a porous or perforated cylindrical layer located in the annular chamber such that a pair of annular compartments are defined on either side of the cylindrical layer, wherein one compartment is large enough to receive an air/fuel mixture and distribute the mixture uniformly through the cylindrical layer, and the other compartment has a thickness large enough for flames to form therein.

17. A system as claimed in claim 4 further comprising a cylindrical porous catalytic layer located inside the annular chamber such that a pair of annular compartments are defined on either side of the layer and composed of a porous material with pores coated with catalytic material that promotes combustion of a fuel/air mixture in the annular chamber.

18. A system as claimed in claim 2 wherein the heater further comprises an electric resistive element that generates sufficient heat to heat the catalytic material to an operating temperature.

19. A system as claimed in claim 2 wherein the heater comprises a flame burner fluidly communicable with the air and the fuel and operable to ignite the air and fuel to generate a flame and sufficient heat to heat the catalytic material to an operating temperature.

20. A solid oxide fuel cell system as claimed in claim 10 wherein the pores of the third tube are coated with a catalytic material sufficient to catalytically combust the oxidant and fuel mixture passing therethrough.

21. A system as claimed in claim 12 wherein the pores of the inner tube are coated with a catalytic material sufficient to catalytically combust the oxidant and fuel mixture passing therethrough.

22. A system as claimed in claim 1 wherein the heater is tubular and is at least partly filled with a porous flame arrestor that has a maximum pore size that is smaller than the quenching diameter of the fuel.

23. A system as claimed in claim 1 wherein the heater comprises a flame burner fluidly communicable with the air and the fuel and operable to ignite the air and fuel to generate a flame and sufficient heat to heat the catalytic material to an operating temperature.

* * * * *